United States Patent [19]
Mimura et al.

[11] Patent Number: 5,575,500
[45] Date of Patent: Nov. 19, 1996

[54] OCCUPANT PROTECTING STRUCTURES OF VEHICLE BODY UPPER PORTIONS

[75] Inventors: Etsuhisa Mimura, Shizuoka-ken; Takashi Nakamura, Aichi-ken; Syuiti Tsimoto, Shizuoka-ken, all of Japan

[73] Assignee: Toyota Jidosha Kabushiki Kaisha, Toyota, Japan

[21] Appl. No.: 532,069

[22] Filed: Sep. 22, 1995

[30] Foreign Application Priority Data

Oct. 7, 1994 [JP] Japan .................................. 6-244104
Oct. 14, 1994 [JP] Japan .................................. 6-249642

[51] Int. Cl.⁶ .......................... B60R 21/04; B60R 21/055
[52] U.S. Cl. ........................... 280/751; 296/187; 296/189
[58] Field of Search ............................ 280/751; 296/187, 296/189

[56] References Cited

U.S. PATENT DOCUMENTS

| | | | |
|---|---|---|---|
| 3,539,201 | 11/1970 | Loew | 280/751 |
| 3,779,595 | 12/1973 | Suzuki et al. | 296/187 |
| 3,797,857 | 3/1974 | Reeves | 280/751 |
| 3,904,223 | 9/1975 | Wilfert et al. | 280/751 |
| 4,099,767 | 7/1978 | Kania et al. | 280/751 |
| 5,163,730 | 11/1992 | Welch | 296/189 |
| 5,382,051 | 1/1995 | Glance | 280/751 |

FOREIGN PATENT DOCUMENTS

| | | |
|---|---|---|
| 282306 | 9/1988 | European Pat. Off. . |
| 4125953 | 11/1992 | Japan . |
| 6239189 | 8/1994 | Japan . |
| 6211161 | 8/1994 | Japan . |
| 2001915 | 2/1979 | United Kingdom . |
| 2204001 | 11/1988 | United Kingdom . |
| 90/14981 | 12/1990 | WIPO . |

*Primary Examiner*—Kenneth R. Rice
*Attorney, Agent, or Firm*—Cushman, Darby & Cushman

[57] ABSTRACT

An occupant protecting structure of a vehicle body upper portion, which absorbs initial energy of the load caused by an occupant colliding against the body upper portion without increase in weight of the structure. A pillar outer panel, pillar inner panel and pillar reinforce respectively have flange portions at both ends thereof. The respective flange portions of the pillar outer panel, the pillar inner panel and the pillar reinforce are joined in layers by spot welding at each of the both ends. The pillar outer panel, the pillar inner panel and the pillar reinforce form a closed cross-sectional configuration when cut along a virtual line perpendicular to a longitudinal direction of the pillar outer panels, pillar inner panel and pillar reinforce. An energy absorbing panel is disposed further toward the interior of the vehicle than the pillar inner panel with a space therebetween. The energy absorbing panel has a pair of opposing side surface portions at both ends of a pressure-applied portion of the energy absorbing panel. The pair of side surface portions of the energy absorbing panel are respectively joined with side surface portions of the pillar inner panel by spot welding. The thickness T1 of the energy absorbing panel is made smaller than the thickness T2 of the pillar outer panel and the thickness T3 of the pillar inner panel.

20 Claims, 18 Drawing Sheets

F I G. 1
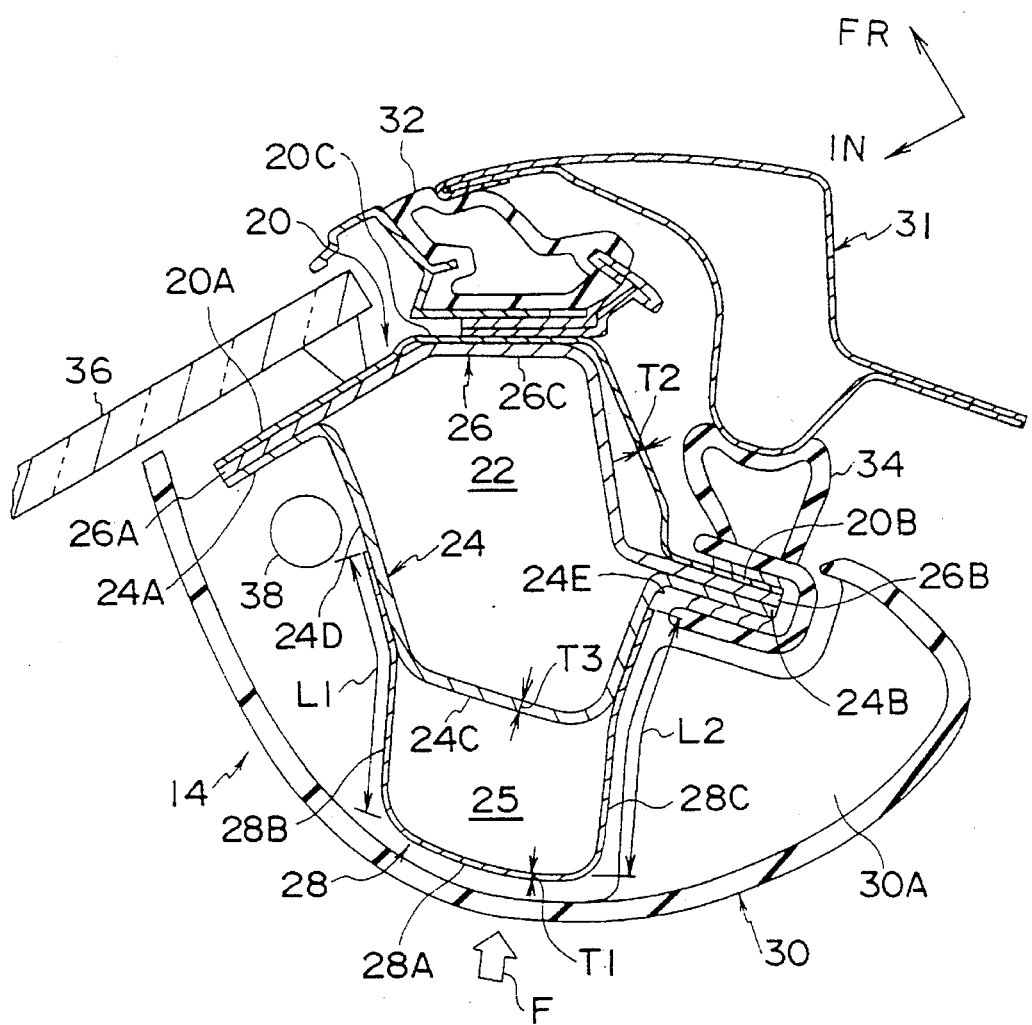

OCCUPANT PROTECTING STRUCTURES OF VEHICLE BODY UPPER PORTIONS

BACKGROUND OF THE INVENTION

1. Field of the Invention

The present invention relates to an occupant protecting structure of a vehicle body upper portion, and particularly to an occupant protecting structure of a vehicle body upper portion, which is applied to at least one of a pillar and a roof rail.

2. Description of the Related Art

Conventionally, there has been known, as an occupant protecting structure of a vehicle body upper portion, a structure in which an inner side of a pillar and/or an inner side of a roof rail in a transverse direction of a vehicle are/is covered with a garnish made of resin material. With this structure, generally, a closed cross-sectional configuration is formed by connecting an outer panel and an inner panel of the pillar and/or the roof rail, and the pillar and/or the roof rail have/has a large rigidity and strength. Accordingly, from a viewpoint of protecting an occupant from a vehicle to improve safety of an inner panel having a large rigidity and strength.

There is disclosed in Japanese Patent Application Laid-Open No. 6-211161, a high-safety occupant protecting structure of a vehicle body upper portion of a roof rail.

As shown in FIG. 17, a roof rail 70 includes a roof outer panel 72, a thin-walled roof inner panel 74, a roof reinforce 76, and a honeycomb-structural body 78. The roof reinforce 76 is disposed between respective joint portions of the roof inner panel 74 and the roof outer panel 72 so as to divide a closed cross-sectional area of the roof rail 70 into two sections of an interior side and an exterior side of a vehicle. The honeycomb-structural body 78 for preventing deterioration of rigidity of the roof inner panel 74 is disposed within a closed cross-sectional area between the roof reinforce 76 and the roof inner panel 74 and is provided along the same direction as that in which the closed cross-sectional area between the roof reinforce 76 and the roof inner panel 74 is disposed. With this structure, when an occupant's head portion collides against the roof rail 70 by a collision in a lateral direction, the root inner panel 74 easily deforms so that the honeycomb-structural body 78 for preventing deterioration of rigidity of the roof inner panel 74 is easily crushed.

However, since the honeycomb-structural body 78 is an essential component in this structure, a cost of the honeycomb-structural body 78 and a process of building-in the honeycomb-structural body are required.

Further, another example of the occupant protecting structure of the vehicle body upper portion is disclosed in Japanese Patent Application Laid-Open No. 4-125953.

As shown in FIG. 18, with this structure disclosed therein, a garnish 84 for covering an inner panel 82 of a center pillar 80 is formed hollow by a back wall 84A serving as a surface to be mounted on the inner panel 82 and a front wall 84B separated from the back wall 84A, and a front-wall receiving portion 84C having a semicircular cross-sectional configuration and projecting toward the front wall 84B is formed along a vertical direction and integrally formed with the back wall 84A at a central portion thereof in a longitudinal direction of the vehicle. When external force is applied to the front wall 84B of the garnish 84 due to an occupant colliding against the garnish 84, the front wall 84B flexibly deforms and contacts the front-wall receiving portion 84C with pressure, so that compressive load acts on the front-wall receiving portion 84C. This compressive load is dispersed in a circumferential direction of the front-wall receiving portion 84C due to the semicircular cross-sectional configuration thereof. For this reason, localized deformation of the front-wall receiving portion 84C due to concentration of the load is prevented and the front-wall receiving portion 84C deforms entirely with its diameter enlarged. In this way, absorption of energy is attained by each elastic deformation of the front wall 84 and the front-wall receiving portion 84C and the whole elastic deformation of the hollow garnish 84.

However, since this structure is constructed such that absorption of energy is effected by the garnish 84 made of resin material, when considering changes in the resin material over time, there existed a drawback in that the shape of the garnish 84 becomes complicated as described above in order to obtain stabilized energy absorption characteristics for a long period of time.

Prior art of the present invention is also disclosed in Japanese Patent Application Laid-Open No. 6-239189, and U.S. Pat. Nos. 3,779,595, 5,163,730 and 5,382,051.

SUMMARY OF THE INVENTION

In view of the above-described circumstances, it is an object of the present invention to provide an occupant protecting structure of a vehicle body upper portion, which can obtain building-up characteristics of a predetermined load without increase in total weight of the occupant protecting structure.

Further, another object of the present invention is to provide an occupant protecting structure of a vehicle body upper portion, in which the shape of a garnish is simple and stabilized energy absorption characteristics can be obtained for a long period of time.

In accordance with a first embodiment of the present invention, there is provided, an occupant protecting structure of a vehicle body upper portion, which is applied to at least one of a pillar and a roof rail, at least one of the pillar and the roof rail comprising: an outer panel having a predetermined thickness; an inner panel having a predetermined thickness and disposed further toward an interior of a vehicle than said outer panel with a space therebetween; and an energy absorbing panel having a thickness smaller than those of said outer panel and said inner panel and disposed further toward the interior of the vehicle than said inner panel with a space therebetween, wherein said inner panel has a pair of opposing side surface portions at both ends of an intermediate portion of said inner panel, said energy absorbing panel has a pair of opposing side surface portions which are formed at both ends of a pressure-applied portion to which load is applied from a head portion of an occupant and which are respectively fixed to the pair of side surface portions of said inner panel, and said outer panel and said inner panel form a closed cross-sectional configuration when cut along a virtual line perpendicular to a longitudinal direction of said outer and inner panels in a state in which one flange portions and another flange portions of said outer panel and said inner panel are respectively joined in layers.

According to the first embodiment of the present invention, when load of a predetermined value or more is applied to the pressure-applied portion of the energy absorbing panel, the energy absorbing panel deforms in an outward direction of the vehicle to absorb energy caused by the load. Further, since the pair of side surface portions of the energy absorbing panel are respectively fixed to the pair of side surface portions of the inner panel, each length of the pair of side wall portions of the energy absorbing panel can be set shorter in comparison with a structure where flange portions of the energy absorbing panel are respectively fixed to those of the inner panel. Accordingly, singe the rigidity of the energy absorbing panel becomes high even if the thickness of the energy absorbing panel is not made thick, building-up characteristics of the predetermined load can be obtained.

In this case, if the intermediate surface of the inner panel is set substantially perpendicular to the direction of the occupant's head portion and the pressure-applied portion of the energy absorbing panel has an apex portion facing in the direction of the occupant's head portion and inclined surfaces inclined at respective predetermined angles with respect to the direction of the occupant's head portion, when load of the predetermined value or more is applied to the apex portion of the pressure-applied portion of the energy absorbing panel from the side of the occupant's head portion, the energy absorbing panel plastically deforms in the outward direction of the vehicle to absorb energy caused by the load. On the other hand, when load of the predetermined value or more is applied to any of the inclined surfaces of the pressure-applied portion of the energy absorbing panel from a direction deviated from the direction of the occupant's head portion, the energy absorbing panel can plastically deform in a direction in which the load acts and absorb energy caused by the load, and can also absorb the energy even if the occupant's head portion is rotating while abutting against the inclined surface. For this reason, energy caused by the load can be efficiently absorbed independently of the direction in which the occupant's head port,ion contacts the pressure-applied portion of the energy absorbing panel.

Further, when the side surface portions of the energy absorbing panel are fixed to the side surface portions of the inner panel in vicinities of the intermediate surface thereof, each length of the side surface portions of the inner panel can be made shorter. For this reason, the cross-sectional area of the inner panel can be made smaller and the amount by which the inner panel projects in the inward direction of the vehicle can be lessened.

In accordance with a second embodiment of the present invention, there is provided, an occupant protecting structure of a vehicle body upper portion, which is applied to at least one of a pillar and a roof rail, at least one of the pillar and the roof rail comprising: an outer panel having a predetermined thickness; an inner panel having a predetermined thickness and disposed further toward an interior of a vehicle than said outer panel with a space therebetween; and a garnish disposed further toward the interior of the which than said inner panel, wherein said outer panel and said inner panel form a closed cross-sectional configuration when cut along a virtual line perpendicular to a longitudinal direction of said outer and inner panels in a state in which one flange portions and another flange portions of said outer panel and said inner panel are respectively joined in layers, and said inner panel has an energy absorbing portion including a pressure-applied surface which expands in an inward direction of the vehicle to maintain a predetermined rigidity and strength, with a state in which an area of the closed cross-sectional configuration is made to a size at which building-up characteristics of at least one of the pillar and the roof rail are obtained.

According to the second embodiment of the present invention, when the garnish flexibly deforms due to the occupant colliding against the garnish and abuts against the inner panel with pressure, so that load of a predetermined value or more is applied to the inner panel, the energy absorbing portion whose thickness is smaller than that of the outer panel arid which expands in an inward direction of the vehicle deforms in an outward direction of the vehicle to absorb energy caused by the load. Namely, since energy caused by the load is absorbed due to deformation of the inner panel made of metallic material or the like which is difficult to change over lime even if the shape of the garnish is made simple, stabilized energy absorption characteristics are obtained for a long period of time. Meanwhile, since the energy absorbing portion of the inner panel expands in the inward direction of the vehicle, the closed cross-sectional area of the inner panel enlarges. This makes it possible to maintain the rigidity and strength of at least one of the pillar and the roof rail and also to maintain a stroke amount (distance) of the inner panel for energy absorption.

In this case, when the inner panel has the reinforcing member in an inside portion of the closed cross-sectional configuration of the inner panel on the pressure-applied surface and in vicinities thereof, the pressure-applied surface does not deform locally so that the energy absorption characteristics improve. Further, since the rigidity of the inner panel improves due to the reinforcing member, the closed cross-sectional area of at least one of the pillar and the roof rail can be made smaller. In addition, since the pressure-applied surface and the vicinities thereof begin deforming after deformation of the portion of the inner panel, in which the reinforcing member is not formed, has been completed, the energy caused by the load can be absorbed in two stages.

Further, since the inner panel is provided with the deformation promoting portion which is easy to deform due to load from the interior of the vehicle, when the garnish flexibly deforms due to the occupant colliding against the garnish and abuts against the inner panel with pressure so that load of the predetermined value or more is applied to the inner panel, the inner panel deforms toward the exterior of the vehicle due mainly to the deformation promoting portion and absorbs the energy caused by the load. Namely, since energy caused by the load is absorbed due to deformation of the inner panel made of metallic material or the like which is difficult to change over time, even if the shape of the garnish is made simple, stabilized energy absorption characteristics are obtained for a long period of time. Meanwhile, since the inner panel is adapted to deform due mainly to the deformation promoting portion, even if the thickness of the inner panel is made thick, the inner panel is easy to deform. For this reason, the closed cross-sectional area of at least one of the pillar and the roof rail can be made smaller.

BRIEF DESCRIPTION OF THE DRAWINGS

In the accompanying drawings:

FIG. 1 is an enlarged cross-sectional view taken along the lines 1—1 of FIG. 2 and illustrates a first preferred embodiment of the present invention;

DESCRIPTION OF THE PREFERRED EMBODIMENTS (First Embodiment)

Figure 2:
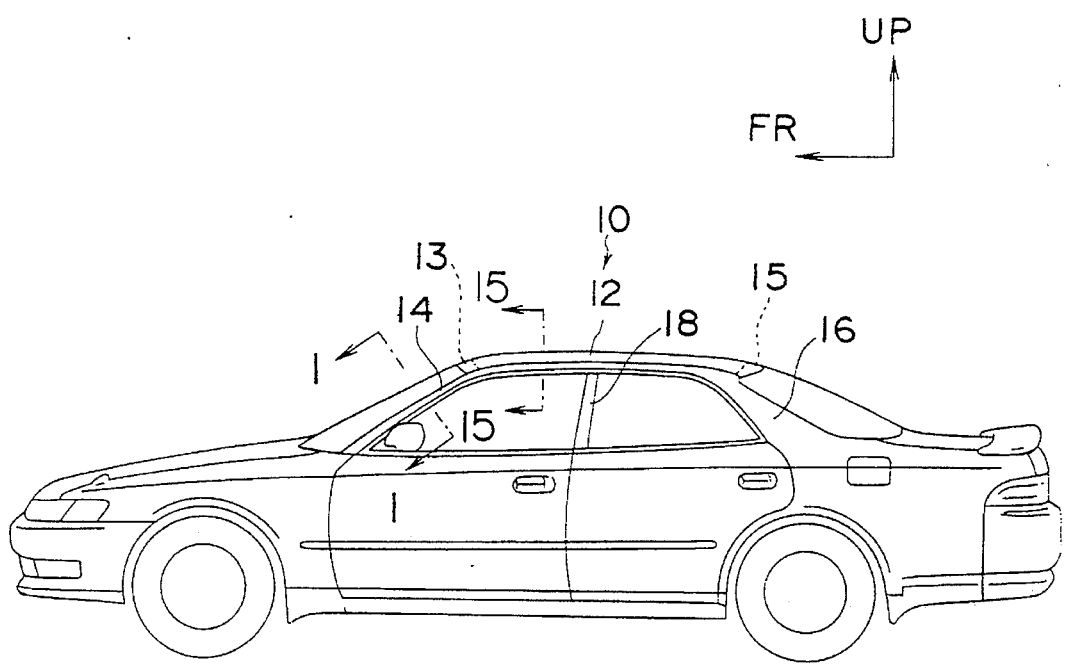
FIG. 2 is a schematic side view illustrating a vehicle body.

Referring now to FIGS. 1 and 2, a description will be given of a first embodiment of an occupant protecting structure of a vehicle body upper portion according to the present invention.

Note that arrows "FR", "UP" and "IN" shown in the drawings, respectively represent: the forward direction of a vehicle; the upward direction thereof; and an inward direction thereof relative to a transverse axis of the vehicle.

As shown in FIG. 2, a pair of roof side rails 12 are respectively disposed along the longitudinal direction of a vehicle body at upper end portions of a vehicle body 10 in a transverse direction thereof. A front roof rail 13 is disposed between each front end portion of the pair of roof side rails 12 and a rear roof rail 15 is disposed between each rear end portion of the pair of roof side rails 12. Further, an upper end portion of a front pillar 14 is connected to the front end portion of each of the roof side rails 12 and an upper end portion of a rear pillar 16 is connected to the rear end portion of each of the roof side rail 12. An upper end portion of a center pillar 18 is connected to an intermediate portion of each of the roof side rails 12 in the longitudinal direction of the vehicle.

As shown in FIG. 1, the front pillar 14 has a pillar outer panel 20, a pillar inner panel 24 and a pillar reinforce 26. The pillar outer panel 20 forms a vehicle-body outside portion of the front pillar 14, the pillar inner panel 24 is disposed further toward the interior of the vehicle than the outer panel 20 with a space 22 therebetween, and the pillar reinforce 26 is disposed between the pillar outer panel 20 and the pillar inner panel 24. The pillar outer panel 20, the pillar inner panel 24 and the pillar reinforce 26 respectively have flange portions 20A, 24A, 26A and flange portions 20B, 24B, 26B. The pillar outer panel 20, the pillar inner panel 24 and the pillar reinforce 26 form a closed cross-sectional configuration when cut along a virtual line perpendicular to the longitudinal direction of the front pillar 14 in a state in which the flange portions 20A, 24A, 26A and the flange portions 20B, 24B, 26B are respectively joined in layers by spot welding.

An intermediate section 20C of the pillar outer panel 20 between the flange portions 20A and 20B is formed as a convex portion which projects in an outward direction of the vehicle and an intermediate section 26C of the pillar reinforce 26 between the flange portions 26A and 26B is also formed as a convex portion which projects in the outward direction of the vehicle. Further, since an intermediate section of the pillar inner panel 24 between the flange portions 24A and 24B projects in an inward direction of the vehicle, the pillar inner panel 24 has a hat-shaped cross-sectional configuration defined by an intermediate surface 24C and a pair of side surface portions 24D, 24E respectively facing ends, of the intermediate surface 24C.

An energy absorbing panel 28 is disposed further toward the interior of the vehicle than the pillar inner panel 24 with a space 25 therebetween. The energy absorbing panel 28 has a substantially U-shaped cross-sectional configuration with a pair of side surface portions 28B, 28C respectively facing ends of a pressure-applied portion 28A to which load is applied from a head portion of an occupant. The pair of side surface portions 28B, 28C are respectively joined with the side surface portions 24D, 24E of the pillar inner panel 24 by spot welding.

It should be noted that the-thickness T1 of the energy absorbing panel 28 is smaller than the thickness T2 of the pillar outer panel 20 and the thickness T3 of the pillar inner panel 24.

A garnish 30 is disposed further toward the interior of the vehicle than the pillar inner panel 24 and covers the front pillar 14 on the side of the interior of the vehicle. The garnish 30 has a substantially circular-arc-shaped cross-sectional configuration when cut along a virtual line perpendicular to a longitudinal direction of the garnish 30. Further, buffer ribs 30A are formed in the garnish 30 at a position facing a joint portion of the flange portions 20B, 24B, 26B and the side surface portion 28C of the energy absorbing panel 28 in such a manner as to be disposed at predetermined intervals along the longitudinal direction of the garnish 30.

Meanwhile, when a front side door 31 is closed, the front side door 31 is tightly applied to a weather strip 32 mounted on the pillar outer panel 20 and an opening weather strip 34 mounted to the joint portion of the flange portions 20B, 24B, 26B. Further, there are also shown in FIG. 1 a windshield glass 36 and a wire harness 38.

In operation, when load of the direction indicated by arrow F in FIG. 1 acts on the garnish 30 due to the occupant colliding against the garnish 30, the garnish 30 flexibly deforms and contacts the energy absorbing panel 28 with pressure. When load of a predetermined value or more is applied to the pressure-applied portion 28A of the energy absorbing panel 28, the energy absorbing panel 28 whose thickness T1 is smaller than the thickness T2 of the pillar outer panel 20 and the thickness T3 of the pillar inner panel 24 collapses in the outward direction of the vehicle to absorb energy caused by the load.

Further, the pair of side wall portions 28B, 28C of the energy absorbing panel 28 are respectively joined with the side surface portions 24D, 24E of the pillar inner panel 24 by spot welding. Therefore, in comparison with the conventional structure in which the flange portions of the energy absorbing panel are respectively fixed to the flange portions of the inner panel, respective lengths L1, L2 of the pair of side wall portions 28B, 28C of the energy absorbing panel 28 can be set shorter. Accordingly, even if the thickness T1 of the energy absorbing panel 28 is not made thick, rigidity of the energy absorbing panel 28 becomes high, so that the building-up characteristics of the predetermined load can be obtained.

Figure 3:
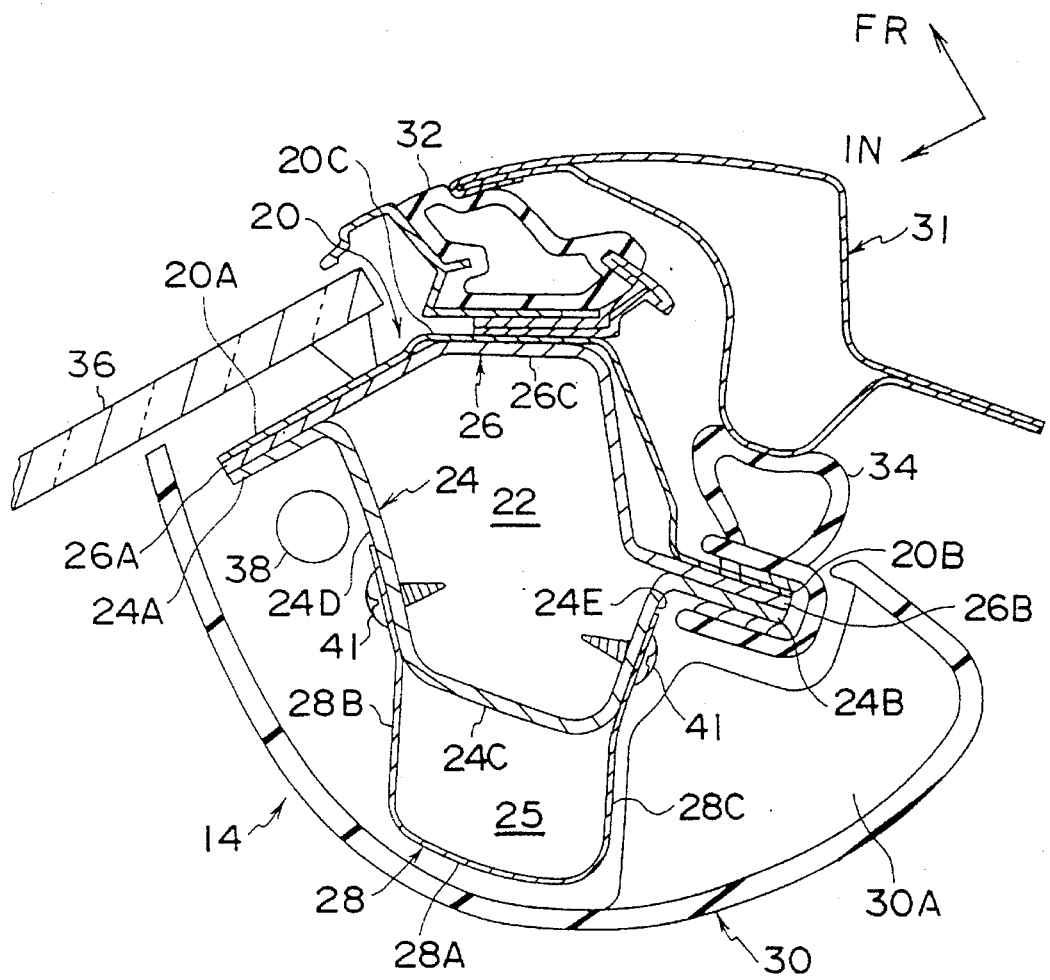
FIG. 3 is a cross-sectional view corresponding to FIG. 1 and illustrating a modified example of the first embodiment.

Meanwhile, the first embodiment is constructed in that the side surface portions 28B, 28C of the energy absorbing panel 28 are respectively fixed to the side surface portions 24D, 24E of the pillar inner panel 24 by spot welding. However, instead of the spot welding, as shown in FIG. 3, the side surface portions 28B, 28C of the energy absorbing panel 28 may be respectively fixed to the side surface portions 24D, 24E of the pillar inner panel 24 by bolts 41. In this case, since the energy absorbing panel 28 can easily be removed by taking off the bolts 41, repairing and replacement of the energy absorbing panel 28 can be easily effected.

Figure 4:
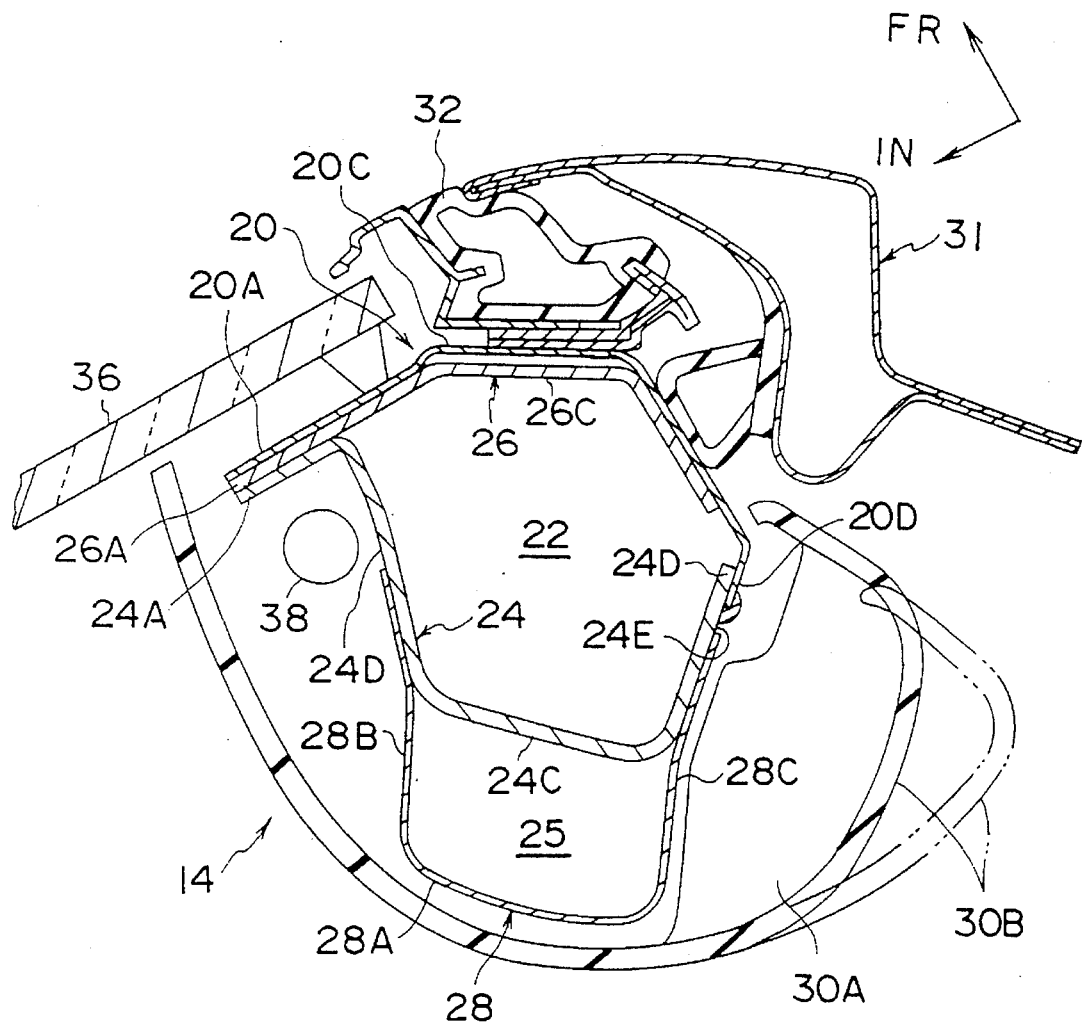
FIG. 4 is a cross-sectional view corresponding to FIG. 1 and illustrating a further modified example of the first embodiment.

Further, as shown in FIG. 4, an end portion 20D of the pillar outer panel 20 facing toward the interior of the vehicle and an end portion 24D of the pillar inner panel 24 facing toward the exterior of the vehicle may be joined with each other by arc welding without the joint portion of the flange portions of the front pillar 14 being formed on the side of the front side door 31. In this case, since the flange portions of the front pillar 14 are not formed on the side of the front side door 31, the ribs 30A of the garnish 30 can be made smaller and a portion 30B of the garnish 30 facing the joint portion of the end portion 20D of the pillar outer panel 20 and the end portion 24D of the pillar inner panel 24 can move from the position indicated by the imaginary lines in FIG. 4 to the position indicated by the solid lines disposed close to the joint portion. Accordingly, lightening of the garnish 30 and reduction in cost thereof can be achieved, and an amount by which the garnish 30 projects in the inward direction of the vehicle can be lessened.

(Second Embodiment)

Next, a description will be given, with reference to FIG. 5, of a second embodiment of an occupant protecting structure of a vehicle body upper portion according to the present invention. It should be noted that, in the second to fourth embodiments of the present invention, the same members as those of the first embodiment will be denoted by the same reference numerals, and a description thereof will be omitted.

Figure 5:
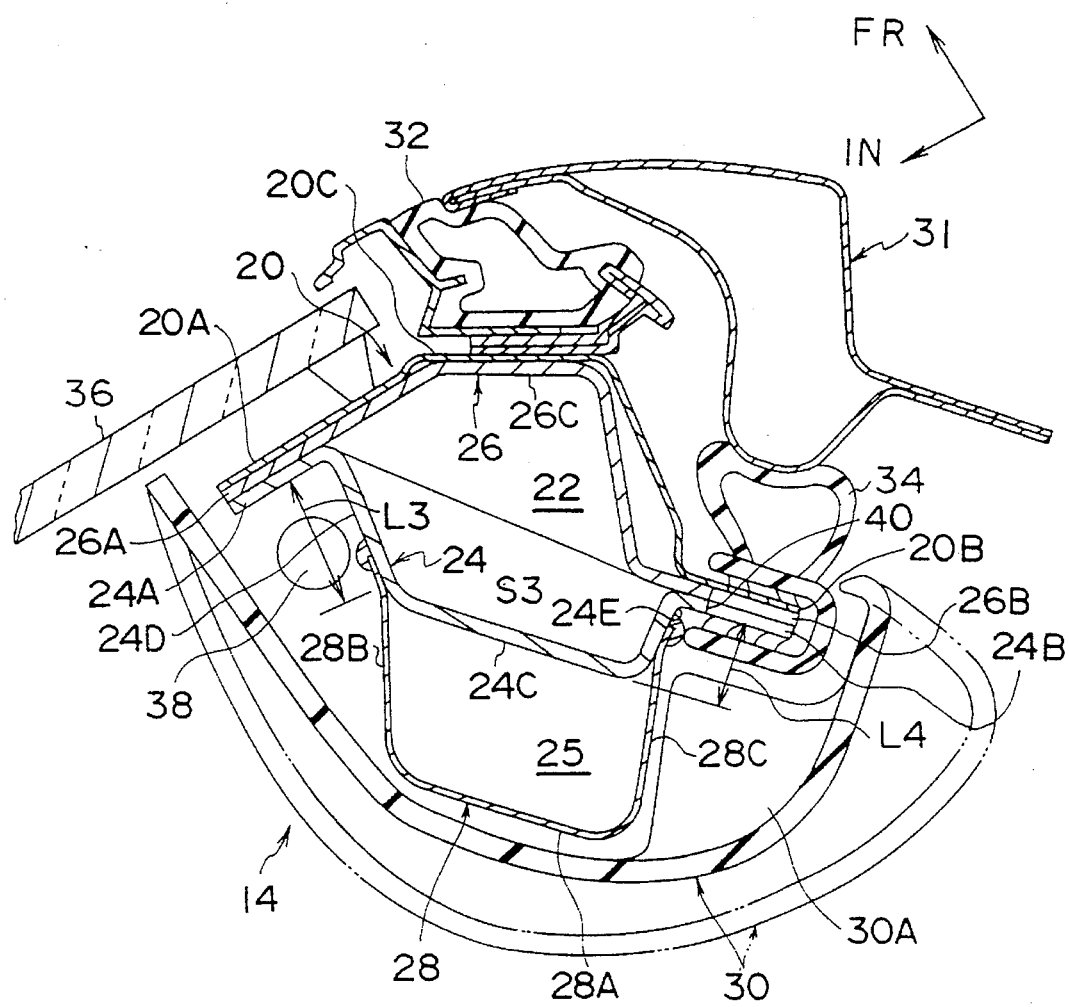
FIG. 5 is a cross-sectional view corresponding to FIG. 1 and illustrating a second preferred embodiment of the present invention.

As shown in FIG. 5, in the second embodiment, respective proximal end portions of the side surface portions 28B, 28C of the energy absorbing panel 28 are fixed by arc welding to the side surface portions 24D, 24E of the pillar inner panel 24, respectively, at locations in vicinities of the intermediate surface 24C. Further, a plurality of notches 40 are respectively formed in the flange portion 24B of the pillar inner panel 24 and the flange portion 26B of the pillar reinforce 26 so as to be disposed at predetermined intervals in each longitudinal direction of the pillar inner panel 24 and the pillar reinforce 25.

Accordingly, in the second embodiment, since the respective lengths L3, L4 of the side surface portions 24D, 24E of the pillar inner panel 24 can be made shorter, a cross-sectional area S3 of the pillar inner panel 24 can be made smaller. At the same time, since the plurality of notches 40 are formed at the joint portion of the flange portions 20B, 24B, 25B so that the energy absorbing panel 28 easily deforms, the ribs 30A each can be made smaller. Thus, the garnish 30 can be moved from the position indicated by the imaginary lines in FIG. 5 to the position indicated by the solid lines disposed further toward the outside of the vehicle than the imaginary lines. Consequently, lightening of the garnish 30 and reduction in cost thereof can be achieved and the amount by which the garnish 30 projects in the inward direction of the vehicle can be lessened. Further, the interior space of the vehicle widens and the forward visibility range also widen.

(Third Embodiment)

Figure 6:
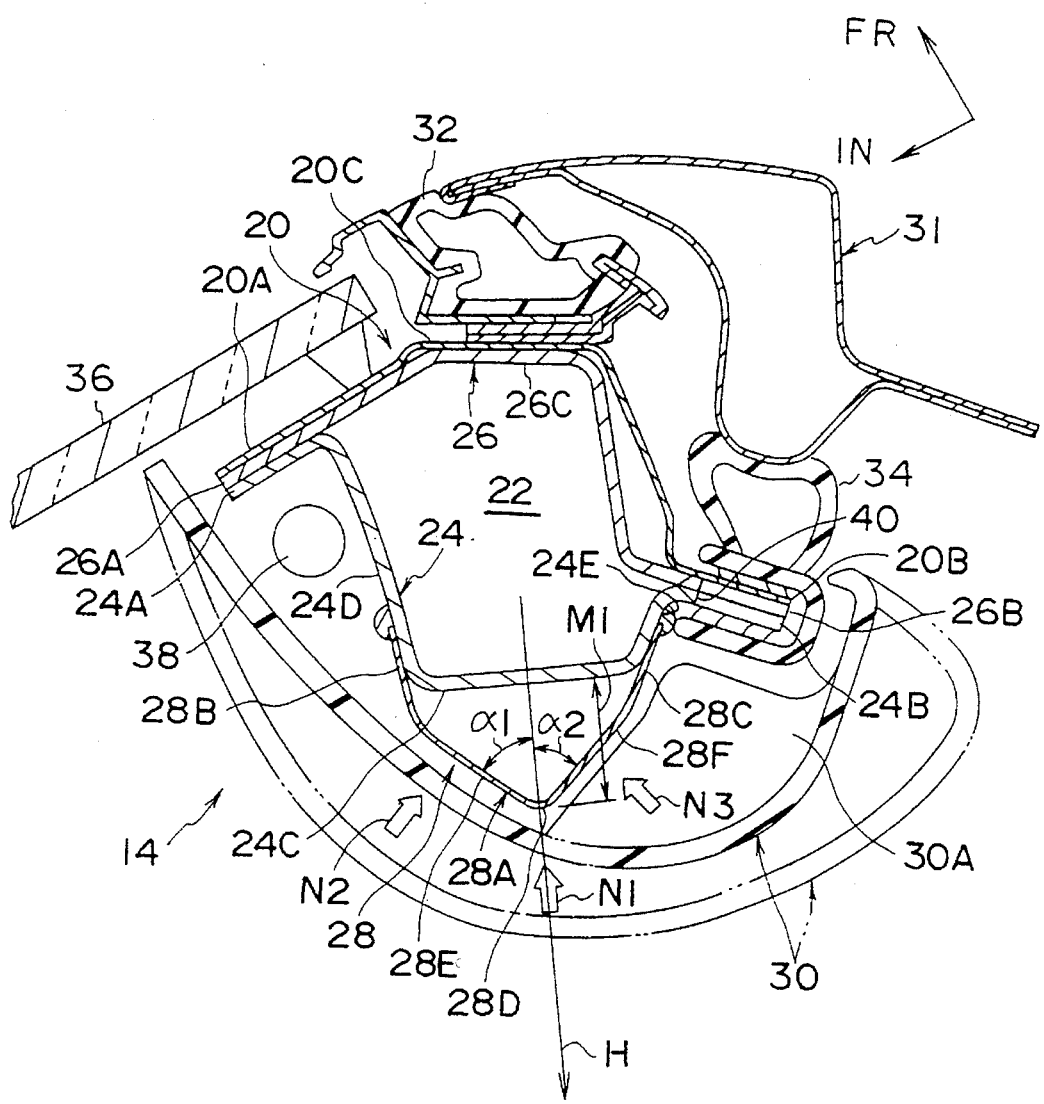
FIG. 6 is a cross-sectional view corresponding to FIG. 1 and illustrating a third preferred embodiment of the present invention.

As shown in FIG. 6, in a third embodiment of the present invention, the intermediate surface 24C of the pillar inner panel. 24 is set substantially perpendicular to a direction of an occupant's head portion (i.e., the direction indicated by arrow H in FIG. 6). Further, the pressure-applied portion 28A of the energy absorbing panel 28 is formed by an apex portion 28D facing in the direction of the occupant's head portion and inclined surfaces 28E, 28F disposed with the apex portion 28D interposed therebetween and inclined at predetermined angles $\alpha 1$, $\alpha 2$, respectively, with respect to the direction of the occupant's head portion. As a result, the energy absorbing panel 28 has a substantially pentagonal cross-sectional configuration.

Accordingly, in the third embodiment, when load of a predetermined value or more (of the direction indicated by arrow N1 in FIG. 6) is applied to the apex portion 28D of the pressure-applied portion 28A of the energy absorbing panel 28 from the direction of the occupant's head portion, the energy absorbing panel 28 plastically deforms in the outward direction of the vehicle within a range of the maximum stroke (distance) M1 and absorbs energy caused by the load. Meanwhile, when load of the predetermined value or more (of the direction indicated by arrow N2 or arrow N3 in FIG. 6) is applied to the inclined surface 28E or the inclined surface 28F of the pressure-applied portion 28A from a direction deviated from the direction of the occupant's head portion, the energy absorbing panel 28 plastically deforms in a direction in which the load acts and absorbs energy caused by the load. At the same time, the occupant's head portion abuts against the inclined surface 28E or the inclined surface 28F. For this reason, absorption of energy can be achieved even in a state in which the occupant's head portion is rotating while abutting against any of the inclined surfaces 28E and 28F. Accordingly, it is possible to efficiently absorb energy independently of the direction in which the occupant's head portion contacts the energy absorbing panel 28.

Further, since the third embodiment is constructed in that the pressure-applied portion 28A of the energy absorbing panel 28 has a substantially pentagonal cross-sectional configuration, the garnish 30 can be moved from the imaginary lines in FIG. 6 to the solid lines disposed further toward the outside of the vehicle than the imaginary lines. For this reason, lightening of the garnish 30 and reduction in cost thereof can be achieved and the amount by which the garnish 30 projects in the inward direction of the vehicle can be lessened. Further, the interior space of the vehicle widens and the forward visibility range also widen.

(Fourth Embodiment)

Figure 7:
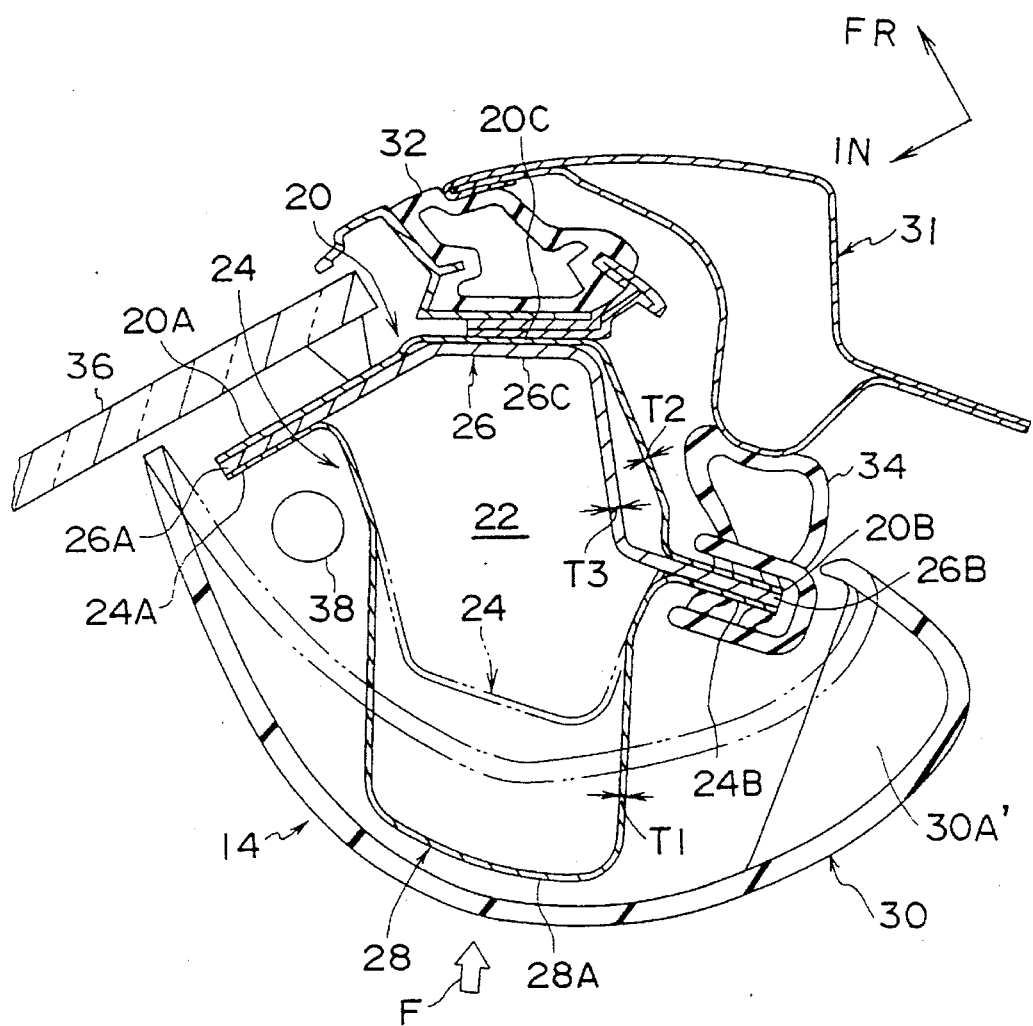
FIG. 7 is a cross-sectional view corresponding to FIG. 1 and illustrating a fourth preferred embodiment of the present invention.

As shown in FIG. 7, the thickness T1 of the pillar inner panel 24 is smaller than the thickness T2 of the pillar outer panel. 20 and the thickness T3 of the pillar reinforce 26 is greater than the thickness T2 of the pillar outer panel 20. An intermediate potion of the pillar inner panel 24 between the flange portions 24A and 24B expands in the inward direction of the vehicle to form an energy absorbing portion 28. The energy absorbing panel 28 has a U-shaped cross-sectional configuration with an opening portion facing toward the exterior of the vehicle. A bottom lower-side surface of the substantially U-shaped energy absorbing portion 28 serves as a pressure-applied portion 28A to which load is applied from the occupant's head portion.

Meanwhile, as shown in FIG. 7, the garnish 30 has a simple structure in which only buffer ribs 30A' are formed therein at locations facing the joint portion of the flange portions 20B, 24B, 26B so as to be disposed at predetermined intervals along the longitudinal direction of the garnish 30.

In the fourth embodiment of the present invention, when load of the direction indicated by arrow F in FIG. 7 acts on the garnish 30 due to the occupant colliding against the garnish 30 and the garnish 30 plastically deforms and abuts against the pillar inner panel 24 with pressure, so that load of the predetermined value or more is applied to the pressure-applied surface 28A of the energy absorbing portion 28 of the pillar inner panel 24, the energy absorbing portion 28 whose thickness T1 is smaller than the thickness T2 of the pillar outer panel 20 and which expands in the inward direction of the vehicle collapses in the outward direction of the vehicle and absorbs energy caused by the load. Namely, since energy caused by the load is absorbed due to deformation of the pillar inner panel 24 formed of metal which is difficult to change over time, even if the shape of the garnish 30 is made simple, stabilized energy absorption characteristics are obtained for a long period of time.

Meanwhile, when the pillar inner panel 24 expands from the position indicated by the imaginary lines in FIG. 7 to the position disposed further toward the interior of the vehicle further the imaginary lines, a closed cross-sectional area of the front pillar 14 enlarges and the rigidity and strength of the front pillar 14 can be maintained. At the same time, a stroke amount of the pillar inner panel 24 for absorbing energy can also be maintained.

Figure 8:
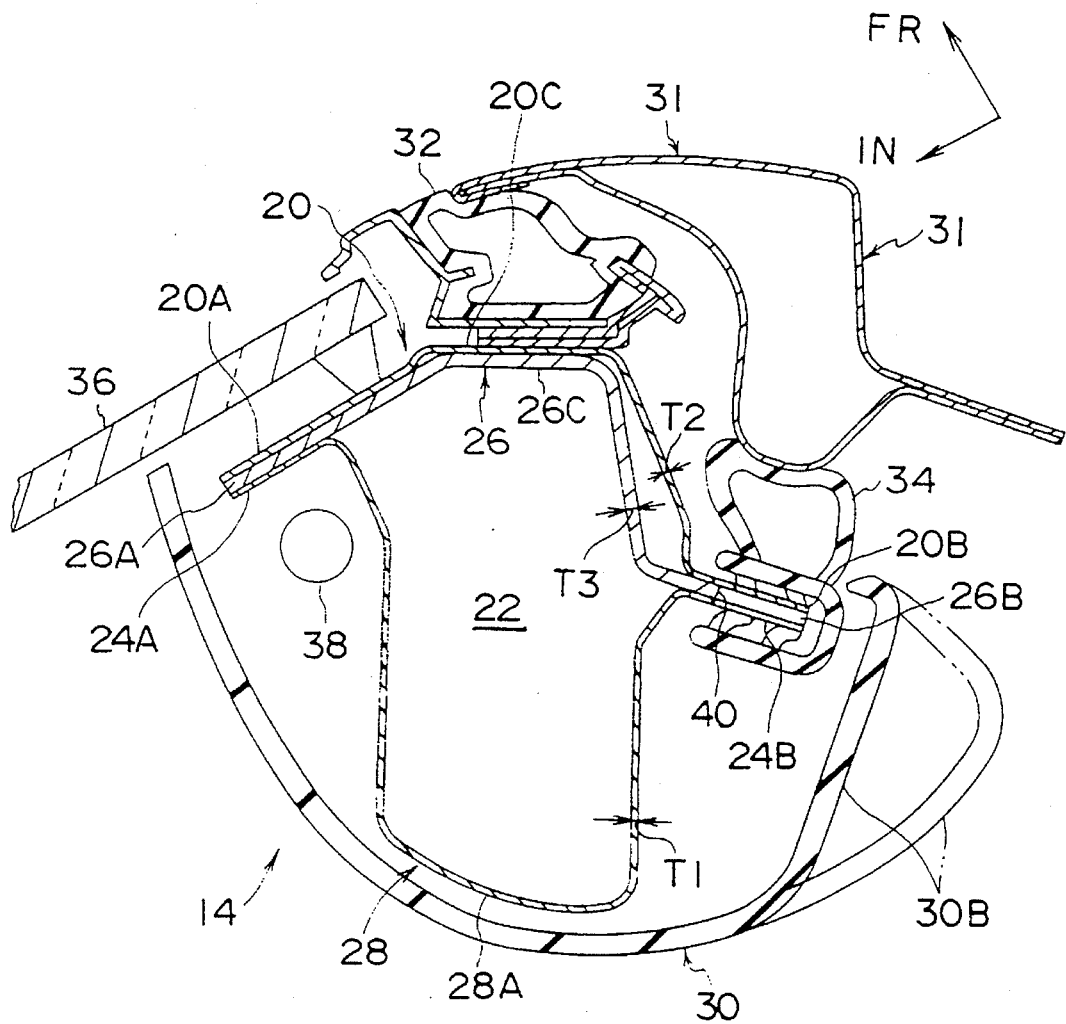
FIG. 8 is a cross-sectional view corresponding to FIG. 1 and illustrating a modified example of the fourth embodiment.

Meanwhile, in the fourth embodiment, the buffer ribs 30A' are formed in the garnish 30 at locations facing the joint portion of the flange portions 20B, 24B, 26B so as to be disposed at predetermined intervals along the longitudinal direction of the garnish 30. However, in place of the buffer ribs 30A', there may be used a structure shown in FIG. 8, in which the joint portion of the flange portions 20B, 24B, 26B can easily be deformed by a plurality of notches 40 which are respectively formed in the flange portion 24B of the pillar inner panel 24 and the flange portion 26B of the pillar reinforce 26 so as to be disposed at predetermined intervals along each longitudinal direction of the pillar inner panel 24 and the pillar reinforce 26. In this case, since the ribs 30A' are not formed in the garnish 30, the portion 30B of the garnish 30 facing the joint portion of the flange portions 20B, 24B, 26B can be moved from the position indicated by the imaginary lines in FIG. 8 to the position indicated by the solid lines disposed further toward the joint portion than the imaginary line. Accordingly, lightening of the garnish 30 and reduction in cost thereof can be achieved and the amount by which the garnish 30 projects in the inward direction of the vehicle can be lessened.

Figure 9:
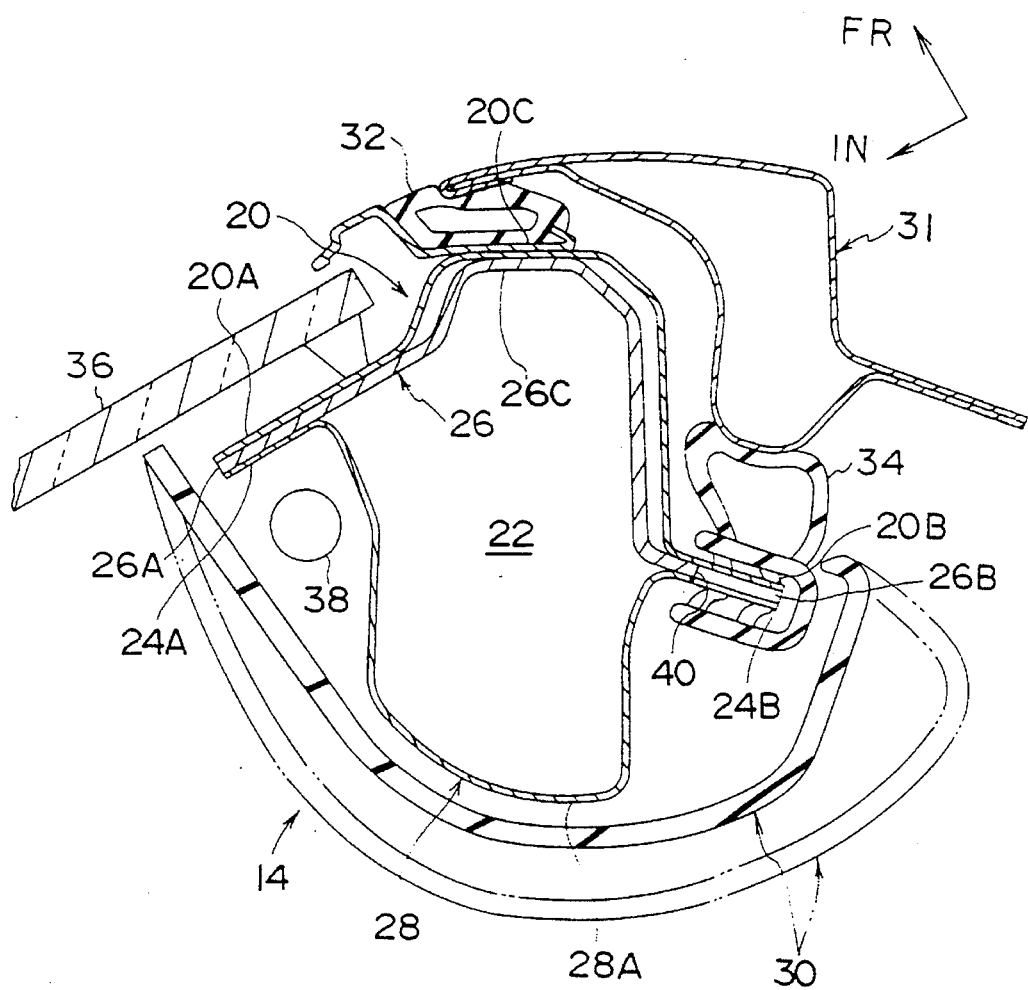
FIG. 9 is a cross-sectional view corresponding to FIG. 1 and illustrating a further modified example of the fourth embodiment.

Further, as shown in FIG. 9, the intermediate portion 20C of the pillar outer panel 20 and the intermediate portion 26C of the pillar reinforce 26 may be caused to project in the outward direction of the vehicle still further. In this case, since a predetermined closed cross-sectional area of the front pillar 14 can be maintained even if an amount by which the energy absorbing portion 28 of the pillar inner panel 24 is lessened, the garnish 30 can be moved from the position indicated by the imaginary lines in FIG. 9 to the position indicated by the solid lines therein and the amount by which the garnish 30 projects in the inward direction of the vehicle can be lessened. For this reason, the interior space of the vehicle widens and the forward visibility range also widens.

(Fifth Embodiment)

Next, a description will be given, with reference to FIG. 10, of a fifth embodiment of the occupant protecting structure of the vehicle body upper portion according to the present invention. It should be noted that, in the fifth through eleventh embodiments of the present invention, the same members as those of the fourth embodiment will be denoted by the same reference numerals, and a description thereof will be omitted.

Figure 10:
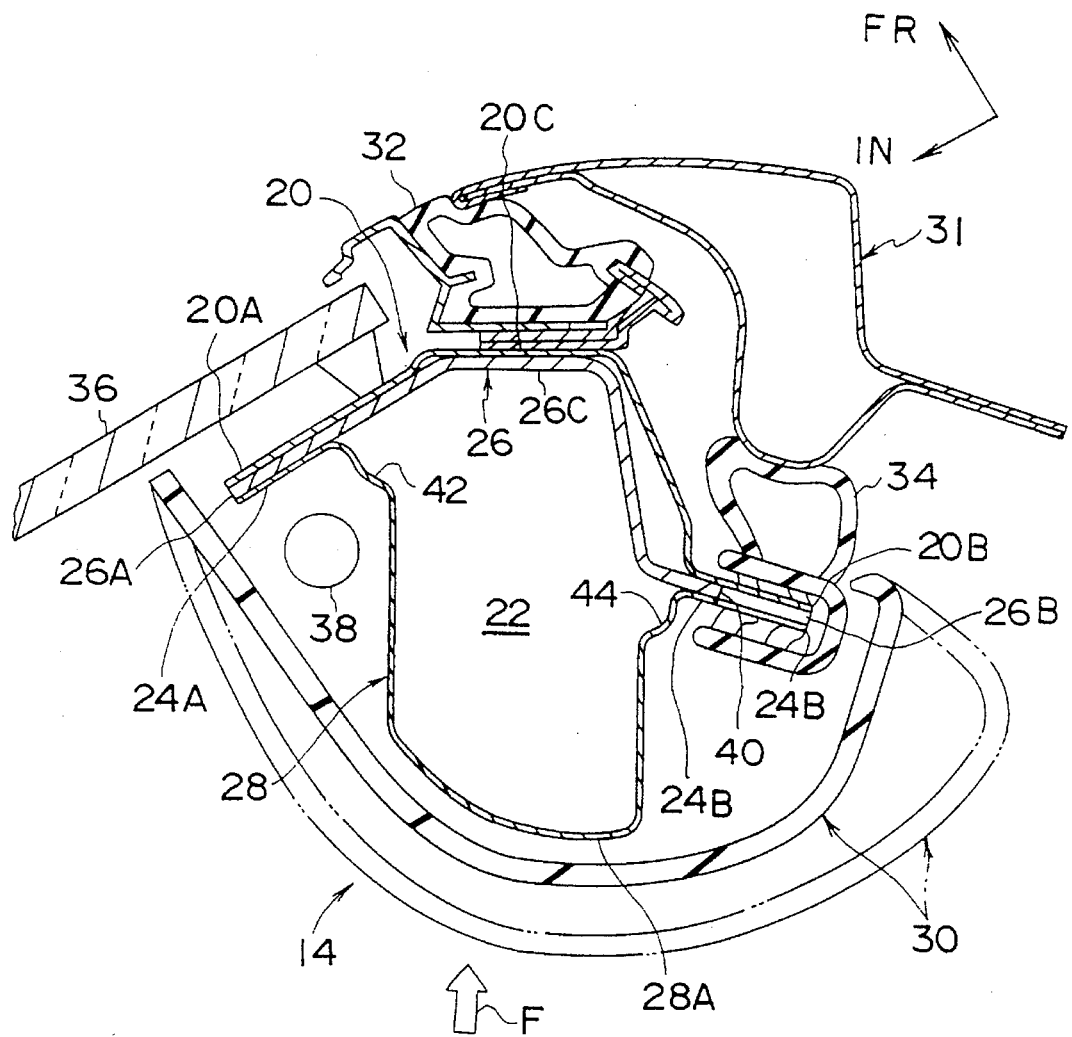
FIG. 10 is a cross-sectional view corresponding to FIG. 1 and illustrating a fifth preferred embodiment of the present invention.

As shown in FIG. 10, the fifth embodiment is constructed in that the thickness T1 of the pillar inner panel 24 is equal to the thickness T2 of the pillar outer panel 20 (i.e., T1=T2). Further, bent portions 42, 44 each serving as a deformation promoting portion are formed in the pillar inner panel 24 at proximal inside portions of the flange portions 24A and 24B, respectively. Thus, when load from the interior of the vehicle acts on the pillar inner panel 24, the pillar inner panel 24 is adapted to easily deform due mainly to the bent portions 42, 44.

Accordingly, when load of the direction of arrow F in FIG. 10 acts on the garnish 30 due to the occupant colliding against the garnish 30 and the garnish 30 flexibly deforms and abuts against the pillar inner panel 24 with pressure, so that load of a predetermined value or more is applied to the pressure-applied surface 28A of the energy absorbing portion 28 of the pillar inner panel 24, the pillar inner panel 24 collapses in the outward direction of the vehicle due mainly to the bent portions 42, 44 and absorbs energy caused by the load.

Namely, since energy caused by the load is absorbed due to deformation of the pillar inner panel 24 made of metal which is difficult to change over time, even if the shape of the garnish 30 is made simple, stabilized energy absorption characteristics are obtained for a long period of time.

Further, since the pillar inner panel 24 is adapted to deform due mainly to the bent portions 42, 44, even if the thickness T1 of the pillar inner panel 24 is equal to the thickness T2 of the pillar outer panel 20, the pillar inner panel 24 easily deforms so that a closed cross-sectional area of the front pillar 14 can be made even smaller. For this reason, the interior space of the vehicle widens and the forward visibility also widens.

Meanwhile, in the fifth embodiment, the bent portions 42, 44 are formed as the deformation promoting portions. However, the deformation promoting portion is not limited to the bent portions 42, 44, and may also be applied in which a stepped portion, a bead, a hole or the like is formed.

(Sixth Embodiment)

Figure 11:
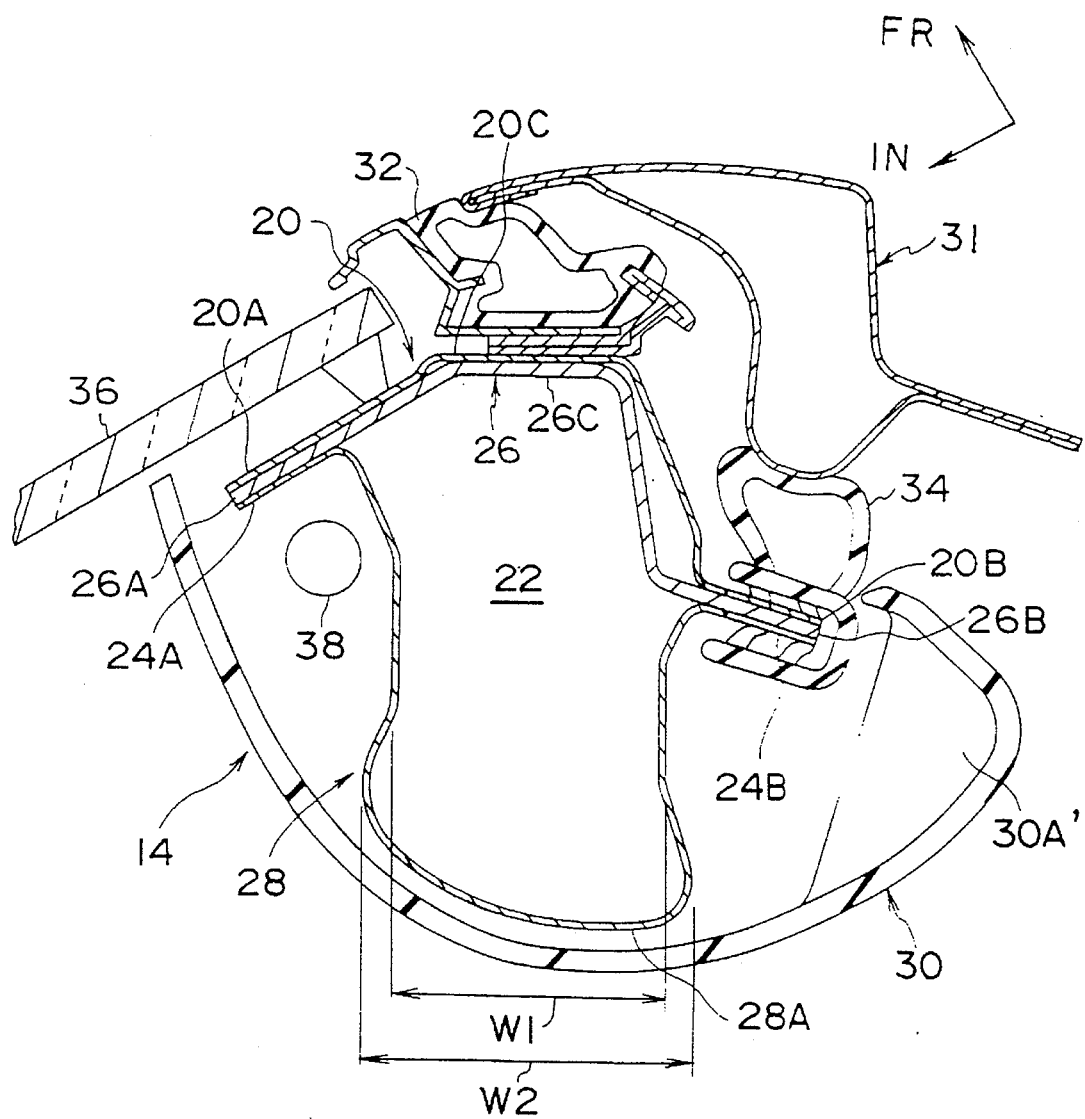
FIG. 11 is a cross-sectional view corresponding to FIG. 1 and illustrating a sixth preferred embodiment of the present invention.

As shown in FIG. 11, a six embodiment of the present invention is constructed in that, a widthwise dimension W2 of the pressure-applied surface 28A to which load is applied from the occupant's head portion is made longer than a dimension W1 between respective portions of the pillar inner panel 24 in vicinities of the flange portions 24A, 24B thereof.

Accordingly, since in this embodiment the widthwise dimension W2 of the pressure-applied surface 28A to which load is applied from the occupant's head portion is made longer than the dimension W1 between the respective portions of the pillar inner panel 24 in the vicinities of the flange portions 24A, 24B, the pressure-applied surface 28A enables the occupant to abut thereagainst with pressure over a wide range from end to end of the pressure-applied surface 28A. At the same time, since the respective portions of the pillar inner panel 24 with the dimension W1 interposed therebetween each serves as the deformation promoting portion, even if the thickness T1 of the pillar inner panel 24 is equal to the thickness T2 of the pillar outer panel 20, the pillar inner panel 24 easily deforms so that the closed cross-sectional area of the front pillar 14 can be made smaller. For this reason, the interior space of the vehicle widens and the forward visibility range also widens.

(Seventh Embodiment)

Figure 12:
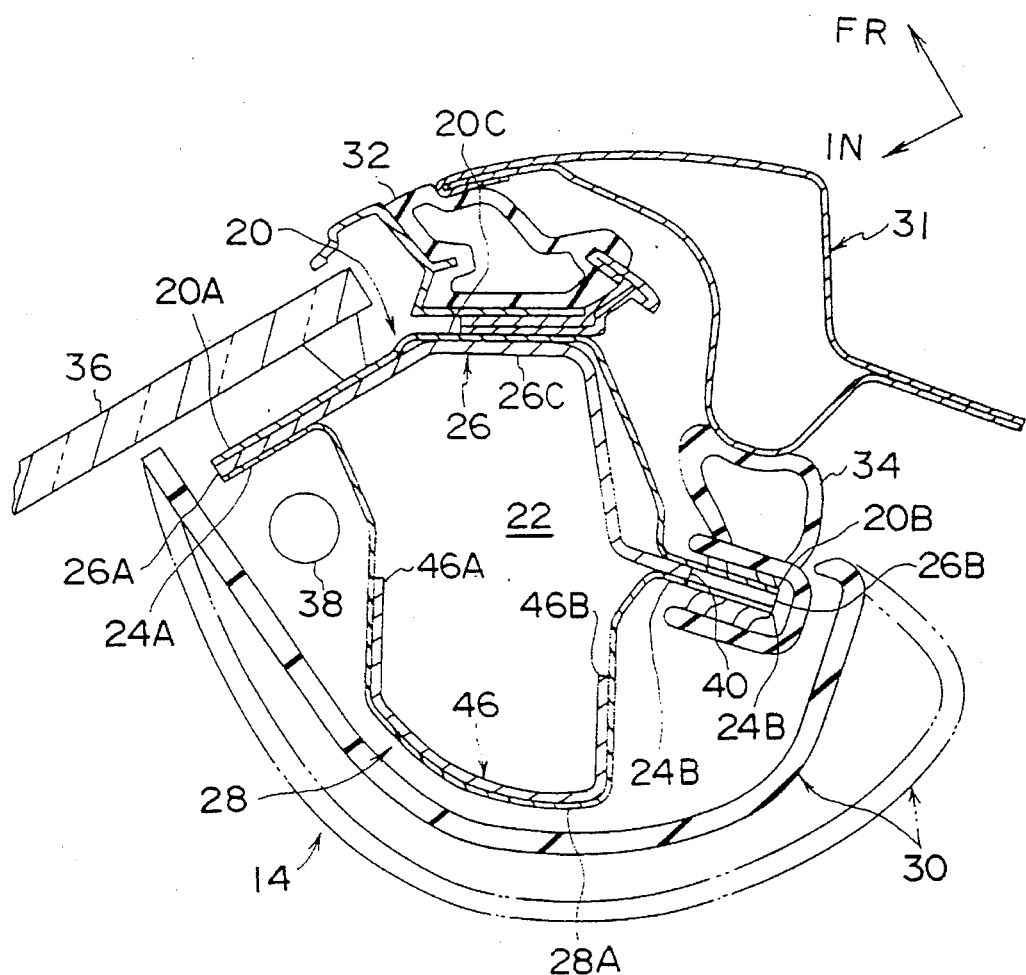
FIG. 12 is a cross-sectional view corresponding to FIG. 1 and illustrating a seventh preferred embodiment of the present invention.

As shown in FIG. 12, a seventh embodiment of the present invention is constructed in that a reinforcing member 46 is joined with a closed cross-sectional inside portion of the pillar inner panel 24 on the pressure-applied surface 28A of the energy absorbing portion 28 and in vicinities thereof. The reinforcing member 46 has a U-shaped cross-sectional configuration along an inside surface of the pillar inner panel 24 and end portions 46A, 46B of the reinforcing member 46 respectively reach the vicinities of the flange portions 24A, 24B.

Accordingly, since in the seventh embodiment the pillar inner panel 24 is provided with the reinforcing member 46 at the closed cross-sectional inside portion of the pillar inner panel 24 on the pressure-applied surface 28A and in the vicinities thereof to which load is to be applied from the occupant's head portion, the pressure-applied surface 28A does not deform locally and the energy absorption characteristics of the energy absorbing portion 28 improves. Further, since the rigidity of the pillar inner panel 24 improves due to the reinforcing member 46, the closed cross-sectional area of the front pillar 14 can be made smaller and the garnish 30 can be moved from the position of the imaginary lines in FIG. 12 to the position of the solid lines therein. For this reason, the interior space of the vehicle widens and the forward visibility range also widens.

Moreover, after deformation of respective portions of the pillar inner panel 24 in vicinities of the flange portions 24A, 24B having no reinforcing member 46 has been completed, the pressure-applied surface 28A and the vicinities thereof begin deforming. Thus, the pillar inner panel 24 can absorb energy caused by the load in two stages.

(Eighth Embodiment)

Figure 13:
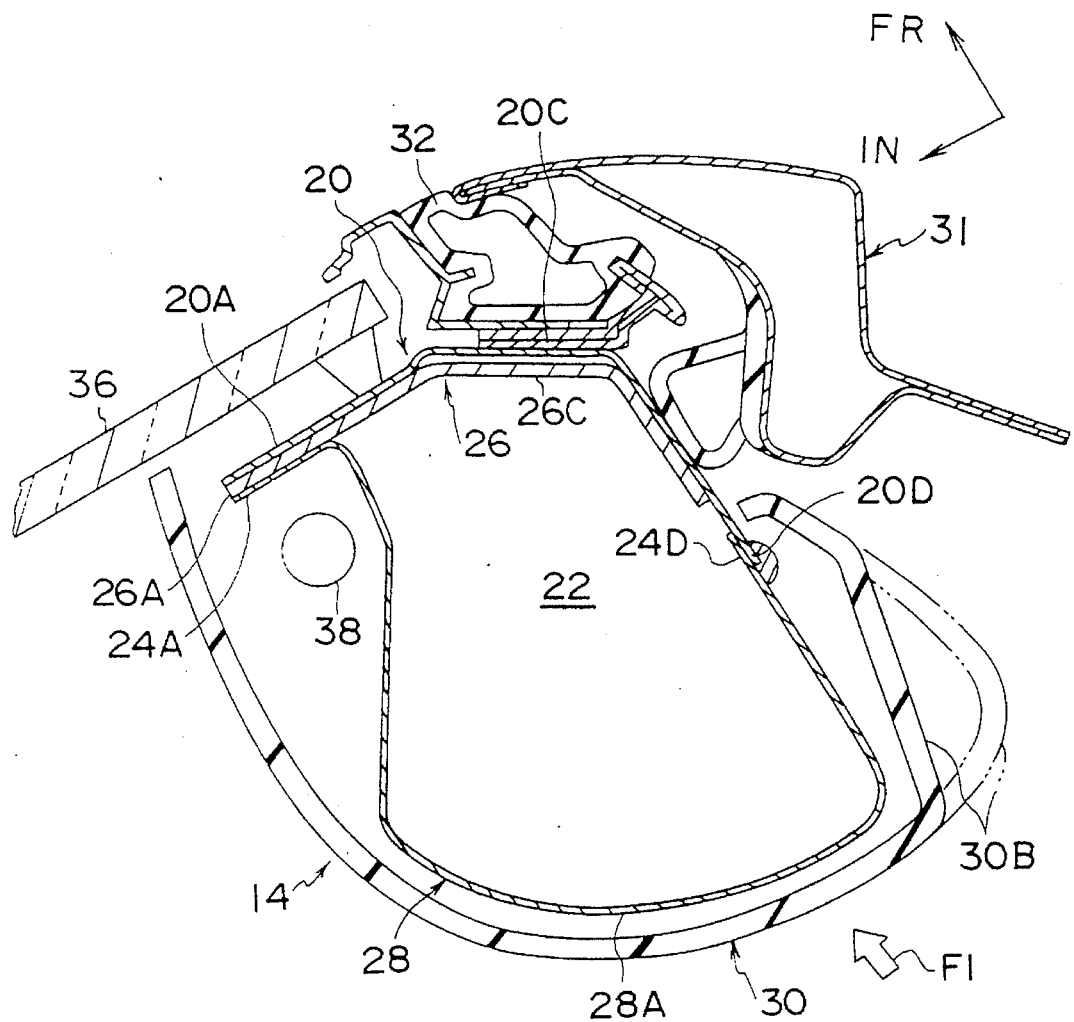
FIG. 13 is a cross-sectional view corresponding to FIG. 1 and illustrating an eighth preferred embodiment of the present invention.

As shown in FIG. 13, an eighth embodiment of the present invention is constructed in that an end portion 20D of the pillar outer panel 20 facing toward the interior of the vehicle and an end portion 24D of the pillar inner panel 24 facing toward the exterior of the vehicle are joined with each other by arc welding without the flange portions of the front pillar 14 being formed on the side of the front side door 31.

Accordingly, in the eighth embodiment, since the flange portions of the front pillar 14 are not formed on the side of the front side door 31, it is not necessary to provide the ribs 30A' shown in FIG. 7 and the portion 30B of the garnish 30 facing the joint portion of the end portions 20D, 24D can be moved from the position of the imaginary lines in FIG. 13 to the position disposed further toward the joint portion than the imaginary lines. For this reason, lightening of the garnish 30 and reduction in cost thereof can be achieved and the amount by which the garnish 30 projects in the inward direction of the vehicle can be lessened. Further, the pillar inner panel 24 becomes easy to deform with respect to load acting on the garnish 30 from the side near the front side door 31 (i.e., load of the direction indicated by arrow F1 in FIG. 13) and can absorb energy caused by the load acting over a wider range of the pillar inner panel 24.

(Ninth Embodiment)

Figure 14:
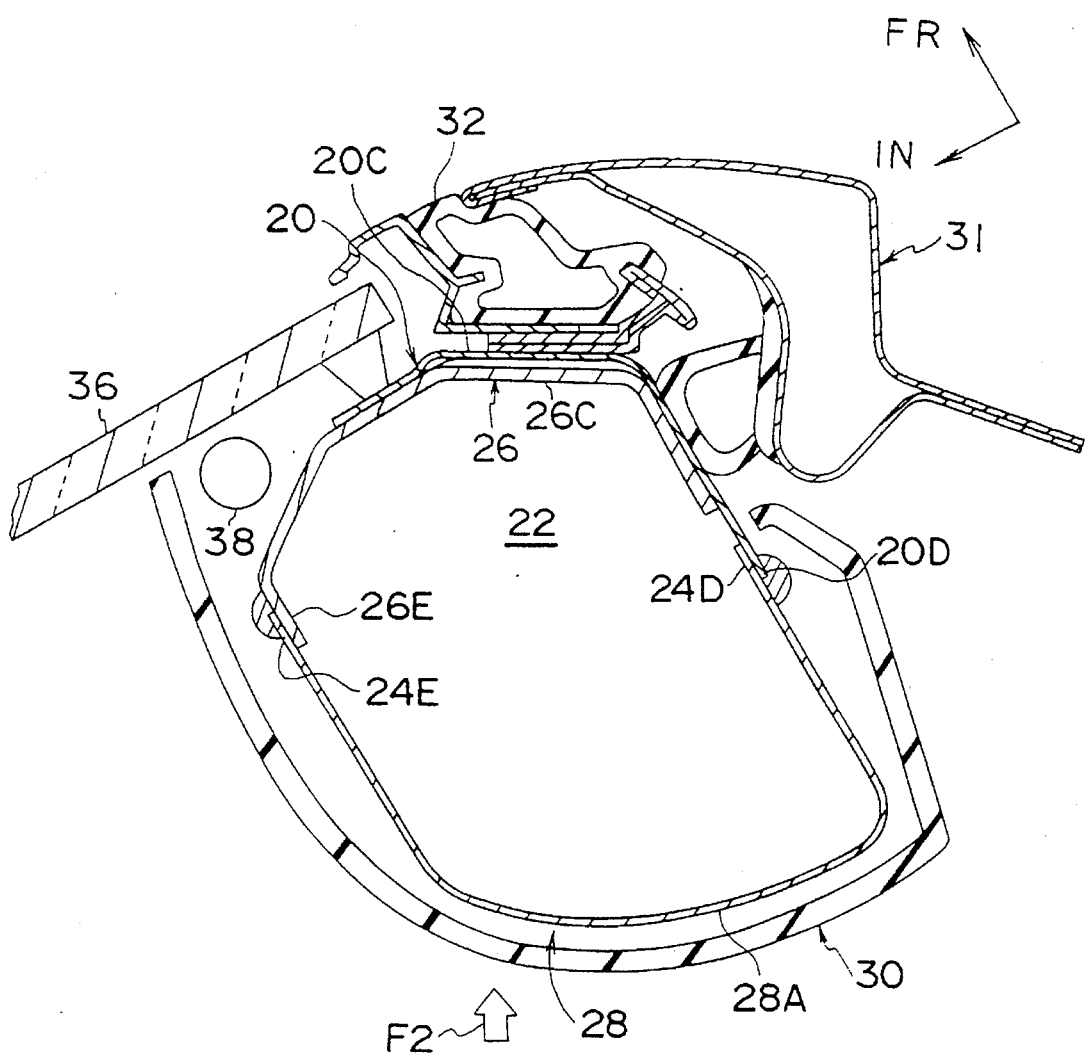
FIG. 14 is a cross-sectional view corresponding to FIG. 1 and illustrating a ninth preferred embodiment of the present invention.

As shown in FIG. 14, a ninth embodiment of the present invention is constructed in that an end portion 26E of the pillar reinforce 26 facing toward the interior of the vehicle and an end portion 24E of the pillar inner panel 24 facing toward the exterior of the vehicle are joined with each other by arc welding without the flange portions of the front pillar 14 being formed on the side of the windshield glass 36.

Accordingly, since the flange portion disposed on the side of the windshield glass 36 is not formed in the ninth embodiment, the pillar inner panel 24 becomes easy to deform with respect to the load acting on the garnish 30 from the side near the windshield glass 36 (i.e., load acting in the direction indicated by arrow F in FIG. 14) and can absorb energy caused by the load acting over a wider range of the pillar inner panel 24.

Meanwhile, each of the above-described embodiments can be applicable in combinations. Further, in each of the above-described embodiments, a description was given of a case in which the occupant protecting structure of the vehicle body upper portion according to the present invention is applied to the front pillar 14. However, the occupant protecting structure of the present invention may also be applied to the rear pillar 16, center pillar 18, roof side rail 12, front roof rail 13, and rear roof rail 15. Next, a description will be described of a case in which the occupant protecting structure of the present invention is applied to the roof side rail 12.

(Tenth Embodiment)

Figure 15:
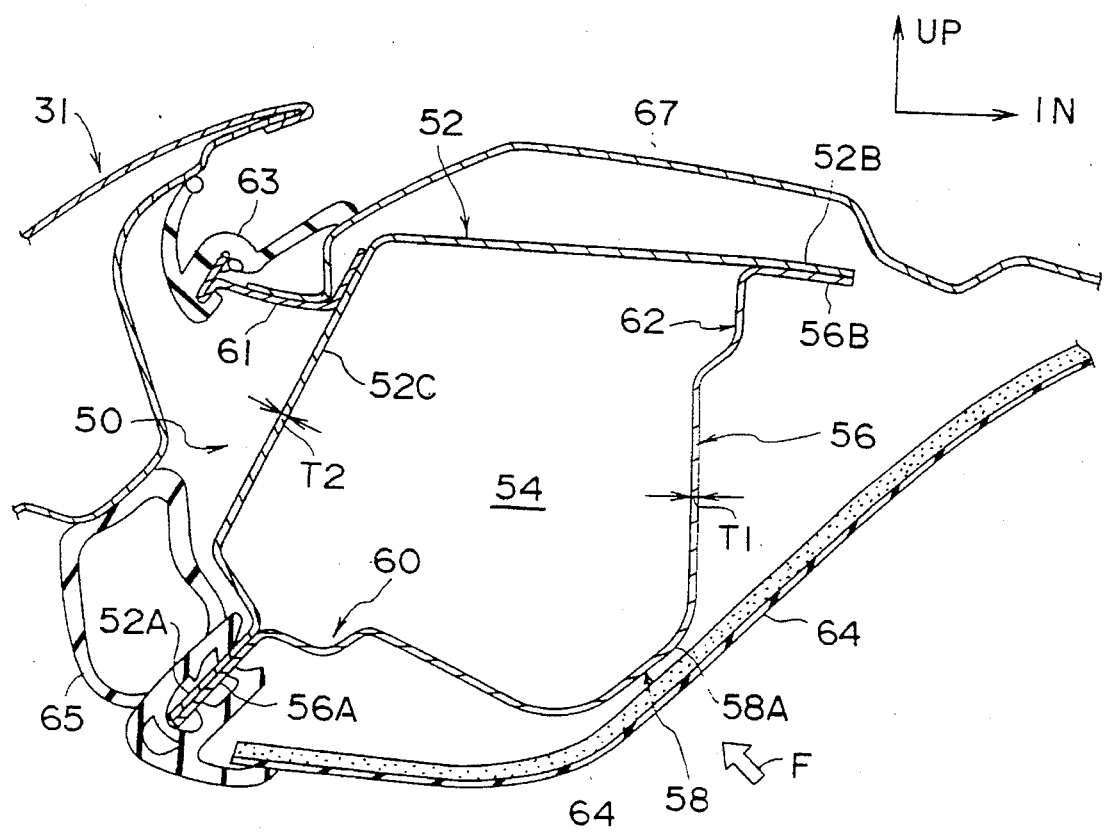
FIG. 15 is an enlarged cross-sectional view taken along the lines 15—15 of FIG. 2 and illustrates a tenth preferred embodiment of the present invention.

As shown in FIG. 15, a roof side rail 50 has a roof-side-rail outer panel 52 forming a body outside portion of the roof side rail 50, and a roof-side-rail inner panel 56 disposed further toward the interior of the vehicle than the outer panel 52 with a space 54 therebetween. The roof-side-rail outer panel 52 and the roof-side-rail inner panel 56 respectively have flange portions 52A, 56A and flange portions 52B, 56B. The roof-side-rail outer panel 52 and the roof-side-rail inner panel 56 form a closed cross-sectional configuration when cut along a virtual line perpendicular to the longitudinal direction of the roof side rail 50 in a state in which the flange portions 52A, 56A and the flange portions 52B, 56B are respectively joined in layers by spot welding.

An intermediate portion 52C of the roof-side-rail outer panel 52 between the flange portions 52A and 52B is formed as a convex portion which projects in the outward direction of the vehicle. An intermediate portion of the roof-side-rail inner panel 56 between the flange portions 56A and 56B expands in the inward direction of the vehicle so as to form an energy absorbing portion 58. The energy absorbing portion 58 has a substantially U-shaped cross-sectional configuration with an opening portion facing toward the outside of the vehicle. A bottom lower-side surface of the substantially U-shaped energy absorbing portion 58 serves as a pressure-applied surface 58A to which load is applied from the occupant's head portion.

Bent portions 60, 62 each serving as the deformation promoting portion are respectively formed in the roof-side-rail inner panel 56 at proximal inside portions of the flange portions 56A and 56B. When load acts on the roof-side-rail inner panel 56 from the side of the interior of the vehicle, the roof-side-rail inner panel 56 is adapted to easily deform due mainly to these bent portions 60, 62.

Meanwhile, a garnish 64 is disposed inside of the roof-side-rail inner panel 56. Further, when the front side door 31 is closed, the front side door 31 is tightly applied to a weather strip 63 mounted on a drip channel 61 and an opening weather strip 65 mounted on a joint portion of the flange portions 52A, 56A. Further, there is also shown a roof panel 67.

Accordingly, with the occupant protecting structure of the vehicle body upper portion of the tenth embodiment, when load of the direction indicated by arrow F in FIG. 15 acts on the garnish 64 due to the occupant colliding against the garnish 64 and the garnish 64 flexibly deforms and abuts against the roof-side-rail inner panel 56 with pressure, so that load of a predetermined value or more is applied to the pressure-applied surface 58A of the energy absorbing portion 58 of the roof-side-rail inner panel 56, the roof-side-rail inner panel 56 collapses in the outward direction of the vehicle due mainly to the bent portions 60, 62 and absorbs energy caused by the load.

In other words, since energy caused by the load is absorbed due to deformation of the roof-side-rail inner panel 56 made of metal which is difficult to change over time, even if the shape of the garnish 64 is made simple, stabilized energy absorption characteristics are obtained for a long period of time.

Further, since the roof-side-rail inner panel 56 is adapted to deform due mainly to the bent portions 60, 62, even if the thickness T1 of the roof-side-rail inner panel 55 is equal to the thickness T2 of the roof-side-rail outer panel 52, the roof-side-rail inner panel 56 easily deforms, which results in decrease in the closed cross-sectional area of the roof side rail 50. For this reason, the interior space of the vehicle widens and the forward visibility range also widens.

(Eleventh Embodiment)

Figure 16:
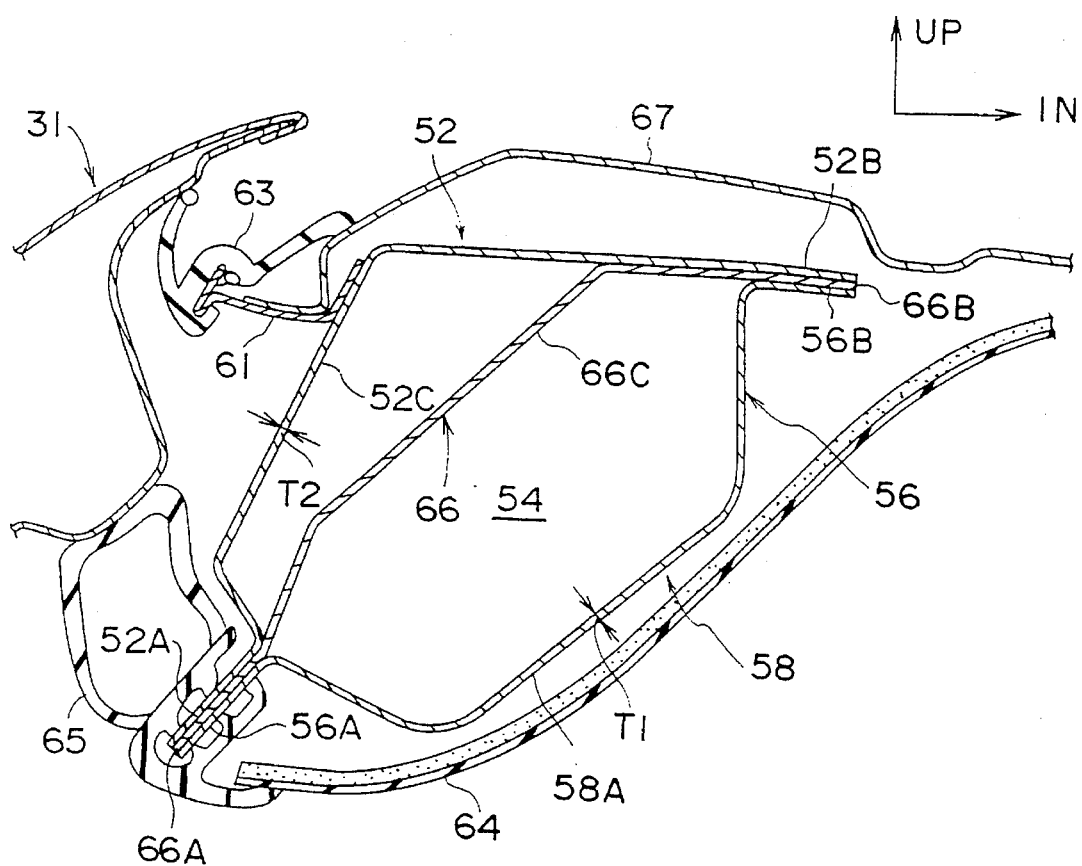
FIG. 16 is a cross-sectional view corresponding to FIG. 15 and illustrating an eleventh preferred embodiment of the present invention.
Figure 17:
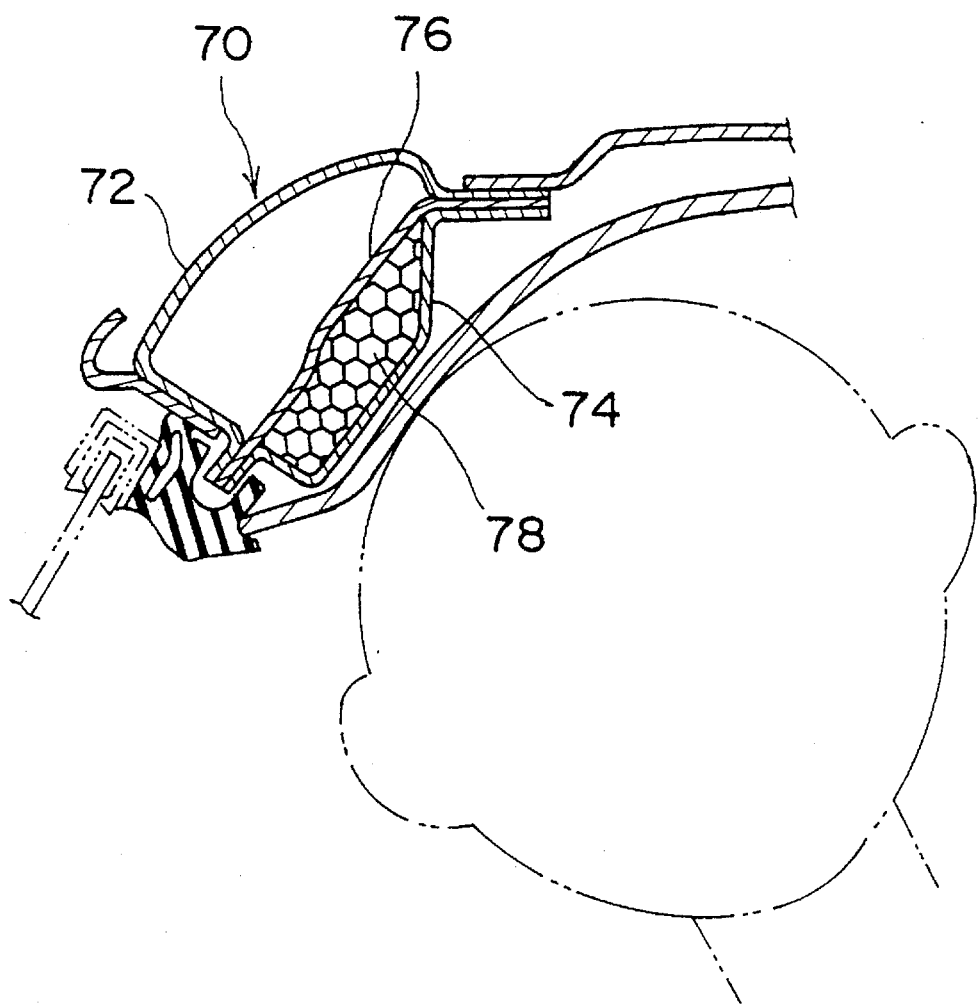
FIG. 17 is a substantially horizontal cross-sectional view of a conventional occupant protecting structure of a vehicle body upper portion.
Figure 18:
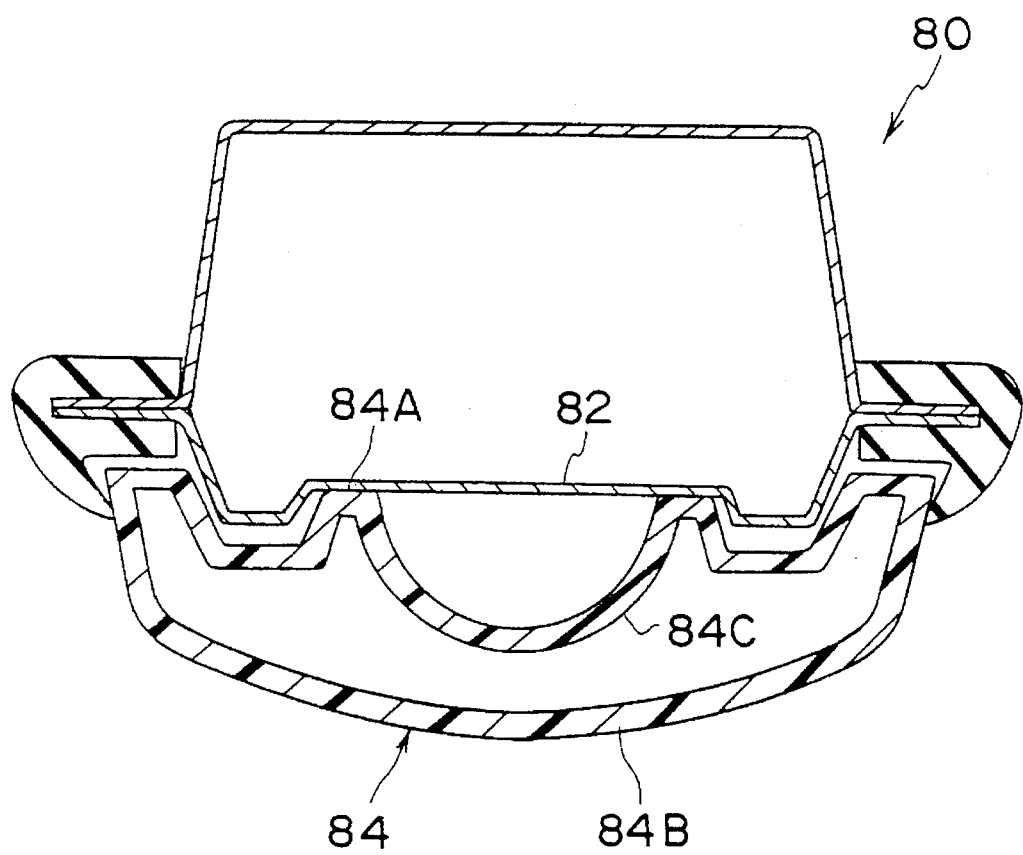
FIG. 18 is a substantially horizontal cross-sectional view of another conventional occupant protecting structure of a vehicle body upper portion.

As shown in FIG. 16, a roof-side-rail reinforce 66 is disposed between the rood-side-rail outer panel 52 and the roof-side-rail inner panel 56 of the roof side rail 50. Flange portions 66A, 66B of the roof-side-rail reinforce 66 are respectively held by the flange portions 52A, 56A and the flange portions 52B, 56B of the roof-side-rail outer panel 52 and the roof-side-rail inner panel 56. An intermediate portion 66C of the roof-side-rail reinforce 66 between the flange portions 66A and 66B is formed as a convex portion which projects in the outward direction of the vehicle when seen from a cross section cut along a virtual line perpendicular to the longitudinal direction of the roof side rail 50.

Further, the thickness T1 of the roof-side-rail inner panel 56 is smaller than the thickness T2 of the roof-side-rail outer panel 52.

Accordingly, with the occupant protecting structure of the vehicle body tipper portion according to the eleventh embodiment, when the garnish 64 flexibly deforms due to the occupant colliding against the garnish 64 and abuts against the roof-side-rail inner panel 56 with pressure, so that load of the predetermined value or more is applied to the roof-side-rail inner panel 56, the roof-side-rail inner panel 56 whose thickness T1 is smaller than the thickness T2 of the roof-side-rail inner panel 56 deforms toward the roof-side-rail reinforce 66 and absorbs energy caused by the load.

In other words, since energy caused by the load is absorbed due to deformation of the roof-side-rail inner panel 56 made of metal which is difficult to change over time, even if the shape of the garnish 64 is made simple, stabilized energy absorption characteristics are obtained for a long period of time.

Further, since the roof-side-rail reinforce 66 is provided in this embodiment, even if the thickness of the roof-side-rail inner panel 56 is made thin, the rigidity and strength of the roof side rail 50 can be maintained without increase in the closed cross-sectional area of the roof side rail 50. This means that the closed cross-sectional area thereof can be made smaller. Moreover, since the roof-side-rail reinforce 66 is formed as a convex shape which projects in the outward direction of the vehicle, it does not interfere with the deformed roof-side rail inner panel 56.

What is claimed is:

1. An occupant protecting structure of a vehicle body upper portion, which is applied to at least one of a pillar and a roof rail, at least one of the pillar and the roof rail comprising:

an outer panel having a predetermined thickness;

an inner panel having a predetermined thickness and disposed further toward an interior of a vehicle than said outer panel with a space therebetween; and an energy absorbing panel having a thickness smaller than those of said outer panel and said inner panel and disposed further toward the interior of the vehicle than said inner panel with a space therebetween, wherein said inner panel has a pair of opposing side surface portions at both ends of an intermediate portion of said inner panel, said energy absorbing panel has a pair of opposing side surface portions which are formed at both ends of a pressure-applied portion to which load is applied from a head portion of an occupant and which are respectively fixed to the pair of side surface portions of said inner panel, and said outer panel and said inner panel form a closed cross-sectional configuration when cut along a virtual line perpendicular to a longitudinal direction of said outer and inner panels in a state in which one flange portions and another flange portions of said outer panel and said inner panel are respectively joined in layers.

2. An occupant protecting structure of a vehicle body upper portion according to claim 1, wherein an intermediate surface of said inner panel is set substantially perpendicular to a direction of an occupant's head portion, and the pressure-applied portion of said energy absorbing panel has an apex portion facing in the direction of the occupant's head portion and inclined surfaces inclined at respective predetermined angles with respect to the direction of the occupant's head portion.

3. An occupant protecting structure of a vehicle body upper portion according to claim 1, wherein the side surface portions of said energy absorbing panel are respectively fixed to the side surface portions of said inner panel in vicinities of the intermediate surface thereof.

4. An occupant protecting structure of a vehicle body upper portion according to claim 1, wherein a plurality of notches are formed in one of the flange portions of said inner panel so as to be disposed along a longitudinal direction of said inner panel at predetermined intervals.

5. An occupant protecting structure of a vehicle body upper portion according to claim 3, wherein the side surface portions of said energy absorbing panel are respectively fixed by spot welding to the side surface portions of said inner panel in vicinities of the intermediate surface thereof.

6. An occupant protecting structure of a vehicle body upper portion according to claim 3, wherein the side surface portions of said energy absorbing panel are respectively fixed by bolts to the side surface portions of said inner panel in vicinities of the intermediate surface thereof.

7. An occupant protecting structure of a vehicle body upper portion, which is applied to a pillar, the pillar comprising:

an outer panel having a predetermined thickness;

an inner panel having a predetermined thickness and disposed further toward an interior of a vehicle than said outer panel with a space therebetween; and an energy absorbing panel disposed further toward the interior of the vehicle than said inner panel with a space therebetween, wherein said inner panel-has a pair of opposing side surface portions at both ends of an intermediate portion of said inner panel, said energy absorbing panel has a pair of opposing side surface portions which are formed at both ends of a pressure-applied portion to which load is applied from a head portion of an occupant and which are respectively fixed to the pair of side surface portions of said inner panel, and said outer panel and said inner panel form a closed cross-sectional configuration when cut along a virtual line perpendicular to a longitudinal direction of said outer and inner panels in a state in which an end portion of said outer panel facing toward the interior of the vehicle and an end portion of said inner panel facing toward the exterior of the vehicle are joined with each other and a flange portion of said outer panel on a side opposite to the end portion of said outer panel and a flange portion of said inner panel on a side opposite to the end portion of said inner panel are joined with each other in layers.

8. An occupant protecting structure of a vehicle body upper portion according to claim 7, wherein the end portion of said outer panel and the end portion of said inner panel are joined with each other by arc welding.

9. An occupant protecting structure of a vehicle body upper portion, which is applied to at least one of a pillar and a roof rail, at least one of the pillar and the roof rail comprising:

an outer panel having a predetermined thickness;

an inner panel having a predetermined thickness and disposed further toward an interior of a vehicle than said outer panel with a space therebetween; and a garnish disposed further toward the interior of the vehicle than said inner panel, wherein said outer panel and said inner panel form a closed cross-sectional configuration when cut along a virtual line perpendicular to a longitudinal direction of said outer and inner panels in a state in which one flange portions and another flange portions of said outer panel and said inner panel are respectively joined in layers, and said inner panel has an energy absorbing portion including a pressure-applied surface which expands in an inward direction of the vehicle, to maintain a predetermined rigidity and strength, with a state in which an area of the closed cross-sectional configuration is made to a size at which building-up characteristics of at least one of the pillar and the roof rail are obtained.

10. An occupant protecting structure of a vehicle body upper portion according to claim 9, wherein said inner panel has a thickness smaller than that of said outer panel.

11. An occupant protecting structure of a vehicle body upper portion according to claim 9, wherein said garnish is further provided with a plurality of buffer ribs at a location corresponding to a portion where each one of respective flange portions of said outer panel and said inner panel are joined in layers, said plurality of buffer ribs being formed along a longitudinal direction of said garnish at predetermined intervals.

12. An occupant protecting structure of a vehicle body upper portion according to claim 9, wherein said inner panel includes a deformation promoting portion which easily deforms due to load from the interior of the vehicle.

13. An occupant protecting structure of a vehicle body upper portion according to claim 12, wherein said deformation promoting portion easily deforms due to notches which are formed in one of the flange portions of said inner panel so as to be disposed along a longitudinal direction of said inner panel at predetermined intervals.

14. An occupant protecting structure of a vehicle body upper portion according to claim 9, wherein said outer panel includes an intermediate portion facing said energy absorbing portion and projecting in an outward direction of the vehicle, said intermediate portion deforming due to load from the interior of the vehicle.

15. An occupant protecting structure of a vehicle body upper portion according to claim 9, wherein said deformation promoting portion easily deforms due to bent portions formed in vicinities of the flange portions of said inner panel.

16. An occupant protecting structure of a vehicle body upper portion according to claim 9, wherein said inner panel is constructed in that a widthwise dimension of a pressure-applied surface to which load is applied from an occupant's head portion is made longer than a dimension between respective portions of said inner panel in vicinities of the flange portions thereof.

17. An occupant protecting structure of a vehicle body upper portion according to claim 9, wherein said inner panel further comprises a reinforcing member formed at an inside portion of a closed cross-sectional configuration of said inner panel on said pressure-applied surface and in vicinities thereof.

18. An occupant protecting structure of a vehicle body upper portion according to claim 17, wherein said reinforcing member: is formed such that both end portions thereof respectively reach vicinities of the flange portions of said inner panel.

19. An occupant protecting structure of a vehicle body upper portion according to claim 17, wherein said inner panel absorbs load from the interior of the vehicle in two stages which are a stage in which vicinities of said flange portions deform, and a subsequent stage in which said pressure-applied surface and vicinities thereof deform.

20. An occupant protecting structure of a vehicle body upper portion, which is applied to at least one of a pillar and a roof rail, at least one of the pillar and the roof rail comprising:

an outer panel having a predetermined thickness;

an inner panel disposed further toward an interior of a vehicle than said outer panel with a space therebetween;

a reinforce disposed between said inner panel and said outer panel; and a garnish disposed further toward the interior of the vehicle than said inner panel, wherein said inner panel has a thickness smaller than that of said outer panel, and wherein said reinforce is formed as a convex portion which projects in an outward direction of the vehicle when seen from a cross section cut along a virtual line perpendicular to a longitudinal direction of the reinforce, and wherein said outer panel, said inner panel and said reinforce form a closed cross-sectional configuration when cut along a virtual line perpendicular to the longitudinal direction in a state in which respective flange portions of said outer panel, said inner panel and said reinforce are joined in layers at each of both ends of said outer panel, said inner panel and said reinforce.

* * * * *

UNITED STATES PATENT AND TRADEMARK OFFICE
CERTIFICATE OF CORRECTION

PATENT NO. : 5,575,500

DATED : November 19, 1996

INVENTOR(S) : MIMURA et al.

It is certified that error appears in the above-identified patent and that said Letters Patent is hereby corrected as shown below:

On title page,

In Item 75, the third inventor's name should read --Syuiti Isimoto--.

Signed and Sealed this

Twenty-fifth Day of March, 1997

*Attest:*

BRUCE LEHMAN

*Attesting Officer*     *Commissioner of Patents and Trademarks*